United States Patent
Levitsky et al.

(10) Patent No.: US 11,515,968 B2
(45) Date of Patent: Nov. 29, 2022

(54) HIERARCHICAL HYBRID AUTOMATIC REPEAT REQUEST FOR MULTI-LEVEL CODING

(71) Applicant: QUALCOMM Incorporated, San Diego, CA (US)

(72) Inventors: Michael Levitsky, Rehovot (IL); Assaf Touboul, Netanya (IL); Daniel Paz, Tirat Carmel (IL)

(73) Assignee: QUALCOMM INCORPORATED, San Diego, CA (US)

(*) Notice: Subject to any disclaimer, the term of this patent is extended or adjusted under 35 U.S.C. 154(b) by 192 days.

(21) Appl. No.: 17/008,193

(22) Filed: Aug. 31, 2020

(65) Prior Publication Data

US 2022/0069947 A1    Mar. 3, 2022

(51) Int. Cl.
  *H04L 1/18* (2006.01)
  *H04L 5/00* (2006.01)
(52) U.S. Cl.
  CPC .......... *H04L 1/1812* (2013.01); *H04L 1/1845* (2013.01); *H04L 1/1896* (2013.01); *H04L 5/0055* (2013.01)
(58) Field of Classification Search
  CPC ... H04W 28/04; H04W 72/04; H04W 72/042; H04W 88/08; H04L 5/0007;
  (Continued)

(56) References Cited

U.S. PATENT DOCUMENTS

| | | | |
|---|---|---|---|
| 11,246,117 B2* | 2/2022 | Ying | H04L 1/18 |
| 2006/0026485 A1* | 2/2006 | Lin | H03M 13/3972 714/755 |

(Continued)

FOREIGN PATENT DOCUMENTS

| | | | | |
|---|---|---|---|---|
| JP | 2009-055207 A | * | 3/2009 | ............ H04L 1/16 |
| WO | WO-2018144560 A1 | | 8/2018 | |
| WO | WO-2018/144560 A1 | * | 9/2018 | ............ H04L 1/18 |

OTHER PUBLICATIONS

An Efficient Hybrid ARQ System Using Multilevel Coded Modulation With Reduced Constellation Size, Takashi Tamagawa and Hideki Ochiai, Department of Electrical and Computer Engineering-Yokohama National University, Yokohama, Kanagawa 240-8501, Japan, 2008, IEEE/publication in IEEE "Globecom" (Year: 2008).*

(Continued)

*Primary Examiner* — Peter G Solinsky
*Assistant Examiner* — Sanjay K Dewan
(74) *Attorney, Agent, or Firm* — Holland & Hart LLP

(57) ABSTRACT

Methods, systems, and devices for wireless communications are described. The following relates more specifically to hierarchical hybrid automatic repeat request (HARM) for multi-level coding with multi-level sequential demodulation and decoding and code block grouping per decoding level. A user equipment (UE) may receive, during a first time period, a transmission from a base station including a first and second code block group (CBG) with codeblocks associated with a first and second decoding level. The UE may fail to decode the first CBG, may not decode the second CBG, may store post processing samples for the second CBG, and may transmit a feedback message to the base station. The base station may retransmit the first CBG and new data on the second CBG in a second time period. The UE may decode the first CBG and use the post processing samples to decode the second CBG from the first time period.

44 Claims, 17 Drawing Sheets

(58) Field of Classification Search
CPC ... H04L 1/1812; H04L 1/1845; H04L 1/1896; H04L 5/0055; H04L 27/3488; H04L 1/1854
USPC .......................................................... 370/329
See application file for complete search history.

(56) References Cited

U.S. PATENT DOCUMENTS

| | | | | |
|---|---|---|---|---|
| 2008/0310338 | A1* | 12/2008 | Charpenter | H04L 1/1671 |
| | | | | 370/315 |
| 2018/0324816 | A1* | 11/2018 | Islam | H04W 72/048 |
| 2018/0368110 | A1* | 12/2018 | Ying | H04L 1/0041 |
| 2019/0074929 | A1* | 3/2019 | Aiba | H04W 72/1289 |
| 2019/0140784 | A1* | 5/2019 | Xi | H03M 13/2942 |
| 2019/0158227 | A1* | 5/2019 | Gupta | H04L 1/1893 |
| 2020/0008216 | A1* | 1/2020 | Iyer | H04W 72/042 |
| 2020/0059327 | A1* | 2/2020 | Kini | H04W 72/042 |
| 2020/0099480 | A1* | 3/2020 | Grbvlen | H04L 1/1822 |

OTHER PUBLICATIONS

International Search Report and Written Opinion—PCT/US2021/046892—ISA/EPO—dated Dec. 13, 2021.
Tamagawa T., et al., "An Efficient Hybrid ARQ System Using Multi level Coded Modulation with Reduced Constellation Size," 2008 IEEE Global Telecommunications Conference, [IEEE Globecom 2008], New Orleans, Louisiana, Nov. 30, 2008-Dec. 4, 2008, IEEE. Piscataway, NJ. USA, Nov. 30, 2008 (Nov. 30, 2008), pp. 1-5, XP031370411, ISBN: 978-1-4244-2324-8, Section I, par. 2-4, Section II, par. 1,2, Section III, subsection A, par. 1.2, figure 1.

* cited by examiner

HIERARCHICAL HYBRID AUTOMATIC REPEAT REQUEST FOR MULTI-LEVEL CODING

FIELD OF TECHNOLOGY

The following relates generally to wireless communications and more specifically to hierarchical hybrid automatic repeat request (HARQ) for multi-level coding with multi-level sequential demodulation and decoding and code block grouping per decoding level.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support hierarchical hybrid automatic repeat request (HARQ) for multi-level coding with multi-level sequential demodulation and decoding and code block grouping per decoding level. Generally, the described techniques provide for a hierarchical HARQ procedure per decoding level in systems using multi-level coding and multi-level sequential demodulation and decoding. In some cases, a user equipment (UE) may receive a first code block group (CBG) including one or more codeblocks associated with a first decoding level and a second CBG including one or more codeblocks associated with a second decoding level higher than the first decoding level from a base station on the first transmission period. The UE may determine that a decoding procedure associated with the first CBG is unsuccessful (e.g., a cyclic redundancy check (CRC) for one or more codeblocks associated with this CBG failed). In some cases, the UE may store post processing samples associated with the second CBG (e.g., samples related to the corresponding portion of channel resources to be addressed for demodulation of codeblocks included in the second CBG). The UE may transmit a feedback message to the base station indicating that the decoding procedure was unsuccessful for the first CBG and the second CBG (e.g., a negative acknowledgement (NACK) for the first CBG and the second CBG). In response, on the second transmission period, the base station may first transmit a retransmission of the first CBG coupled to a new data transmission for a third CBG including one or more corresponding codeblocks associated with the second decoding level. The base station may transmit the retransmission during the next time period available for transmission to the UE (e.g., the following slot). The UE may attempt to decode the third CBG from the second transmission period and the second CBG from the first transmission period using the stored post processing samples associated with the second CBG based on successful decoding of the first CBG based on its retransmissions. That is, the UE may use code protected partitioning information based on decoding the first CBG and use the partitioning information to assists decoding of the second CBG and the third CBG, which may improve channel use efficiency (e.g., by reducing the volume of retransmitted data).

DETAILED DESCRIPTION

Figure 1:
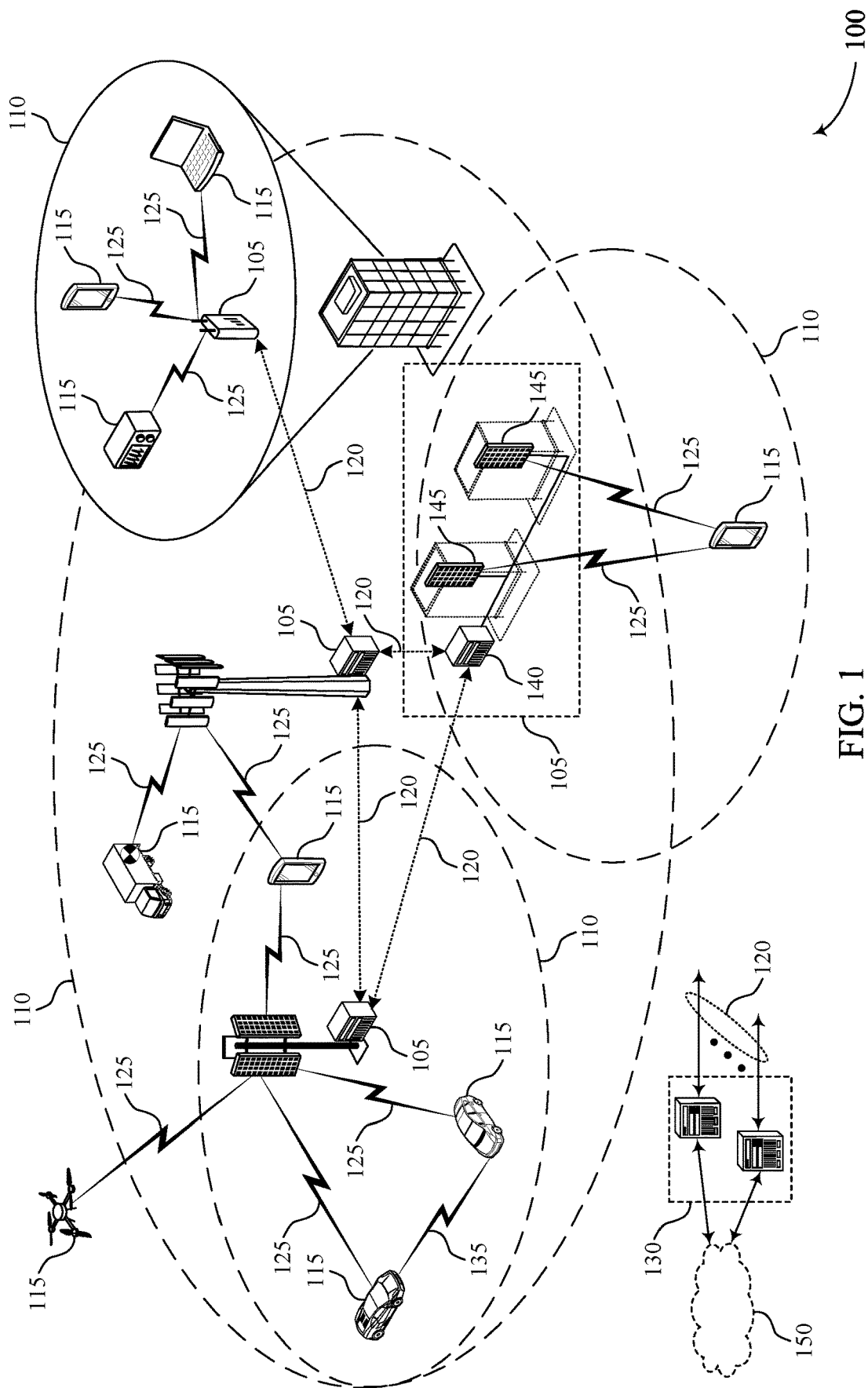
FIGS. 1 and 2 illustrate examples of wireless communications systems that support hierarchical hybrid automatic repeat request (HARQ) for multi-level coding with multi-level sequential demodulation and decoding and code block grouping per decoding level in accordance with aspects of the present disclosure.

In some wireless communications systems, a network node (e.g., a user equipment (UE), a base station, or another wireless device) may encode a transmission, which may include control information or data, to improve communication reliability. For example, a base station may use a multi-level coding procedure to encode a transmission, and a UE may use a multi-level sequential demodulation and decoding to decode the transmission, which may improve spectral efficiency or link efficiency. In some cases, during the encoding process, the transmission may be divided into one or more codeblock groups (CBGs), each CBG including one or more codeblocks. A plurality of codeblocks from one or more CBGs may be associated with a corresponding codeword. Each codeword may be associated with a decoding level of the multi-level coding and multi-level sequential demodulation and decoding procedure. Correspondingly, each CBG may include codeblocks corresponding to a specific decoding level, such that each CBG is also associated with a specific decoding level. The UE may decode the CBGs, starting with the CBGs associated with the lowest decoding level. However, in some cases, a UE may fail to decode one or more codeblocks associated with a lower coding level (e.g., the one or more codeblocks may fail a cyclic redundancy check (CRC)). Thus, the UE may be unable to decode a higher decoding level due to error propagation (lack of reliable set partitioning information for constellation subsets demodulation/selection), and retransmissions may be done for all the corresponding codeblocks (or CBGs) associated with all the decoding levels. In some cases, reliable partitioning information would allow successful decoding of CBGs (or corresponding code blocks) associated with a higher decoding levels and their retransmissions. These scenarios may lead to inefficiencies related to excessive retransmissions of codeblocks associated with a higher decoding levels (e.g., lower link efficiency due to retransmissions) in case of hybrid automatic repeat request (HARQ) procedures or automatic repeat request (ARQ) procedures.

As described herein, hierarchical HARQ may be used during a multi-level sequential demodulation and decoding procedure to account for dependencies between different decoding levels. For example, a UE may receive a transmission encoded according to a multi-level coding scheme. The transmission may be divided into one or more CBGs, which may include one or more codeblocks associated with the corresponding codewords. The codewords may be associated with a decoding level. For example, a first CBG may include codeblocks associated with codewords from a first decoding level while a second CBG may include codeblocks associated with codewords from a second decoding level that is higher than the first.

In some examples, the UE may receive the encoded transmission and may attempt to decode the first CBG. The UE may fail to decode one or more of codeblocks associated with the first CBG and consequently the first CBG. Due to the decoding level dependency, the UE may fail to decode the second CBG. The UE may transmit a negative acknowledgement (NACK) to the base station for the first CBG and the second CBG in a feedback message. In some cases, the UE may store information, such as post processing samples, related to the second CBG. The base station may retransmit the first CBG in the next available slot based on the feedback. The UE may successfully decode the first CBG based on the initial transmission and the retransmission of the first CBG. The UE may attempt to decode the second CBG based on the stored information after successfully decoding the first CBG. For example, if the UE successfully decodes the first CBG, the UE may use information, such as code protected partitioning information, to attempt to decode the second CBG based on the associated with it buffered post processing samples and a new set of codeblocks for the second CBG transmitted coupled to the retransition of the first CBG. The UE may transmit a feedback message based on attempting to decode the first CBG, the second CBG, the new set of codeblocks for the second CBG, or a combination to the base station.

Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. Implementing various aspects of this disclosure may allow for a hierarchical HARQ procedure where codeblocks/CBGs (or codewords in some cases) are gradually (e.g., hierarchically, in a number of steps) retransmitted following an unsuccessful decoding procedure for one or more levels of the multi-level transmission that includes the codeblocks of the failed CBGs (or failed codewords). Gradually retransmitting CBGs/codewords in a number of steps may decrease the number of CBGs/codewords that are retransmitted during HARQ procedures. Additionally or alternatively, decreasing the number of retransmitted CBGs/codewords may increase system efficiency and decrease communications overhead in communications systems. In some cases, UEs capable of supporting the hierarchical HARQ procedure may utilize the techniques described herein also to potentially improve link efficiency while ensuring reliable communications between UEs and base stations, among other benefits.

Aspects of the disclosure are initially described in the context of wireless communications systems. Aspects of the disclosure are further described in the context of a coding scheme, a processing timeline, and a process flow. Aspects of the disclosure are further illustrated by and described with reference to apparatus diagrams, system diagrams, and flowcharts that relate to hierarchical HARQ for multi-level coding with multi-level sequential demodulation and decoding and code block grouping per decoding level.

FIG. 1 illustrates an example of a wireless communications system 100 that supports hierarchical HARQ for multi-level coding with multi-level sequential demodulation and decoding and code block grouping per decoding level in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, wireless communications system 100 may use a multi-level coding scheme for transmitting a message that may be decoded according to a multi-level sequential demodulation and decoding procedure. For example, a base station 105 may encode a transmission to a UE 115 using a multi-level coding scheme with overlapping channel resources (e.g., time or frequency resources). The UE 115 may receive the encoded transmission and may decode the transmission according to one or more decoding levels of the multi-level coded and modulated transmission. That is, the UE 115 may decode the transmission sequentially from the lowest decoding level to the highest (e.g., according to multi-level demodulation and decoding). In some cases, the UE 115 may depend on the successful demodulation or decoding of the lower levels to decode the higher levels (e.g., there may be a dependency between a higher decoding level and the previous decoding level results). For example, if the UE 115 fails to accurately decode a codeword associated with a first decoding level, the UE 115 may fail to decode a codeword associated with a second decoding level. In some cases, such a decoding level dependency may lead to error propagation of multi-level sequential demodulation and decoding in receivers (e.g., the UE 115), that may result in retransmissions of codewords associated with multiple decoding levels which may cause high signaling overhead (e.g., due to retransmissions) for these cases as well as other inefficiencies in wireless communications system 100.

As described herein, hierarchical HARQ may be used in conjunction with a multi-level sequential demodulation and decoding procedure to account for dependencies between different decoding levels. For example, a UE 115 may receive a transmission encoded and modulated according to a multi-level coding scheme. The transmission may be divided into one or more CBGs, which may include one or more codeblocks associated with the corresponding codewords. Each codeword may be associated with a decoding level of the multi-level coding and multi-level sequential demodulation and decoding procedure. Correspondingly, each CBG may include codeblocks corresponding to a specific decoding level, such that each CBG is also associated with a specific decoding level. For example, a first CBG may include codeblocks associated with codewords from a first decoding level while a second CBG may include codeblocks associated with codewords from a second decoding level that is higher than the first decoding level.

In some examples, the UE 115 may receive the encoded transmission (e.g., a multi-level coded and modulated signal including a first CBG and a second CBG) and may attempt to decode the first CBG. The UE 115 may fail to decode one or more of codeblocks associated with the first CBG and consequently the first CBG. Due to the decoding level dependency, the UE 115 may fail to decode the second CBG. The UE 115 may transmit a NACK to the base station 105 for codeblocks of the first CBG and for the second CBG in a feedback message. In some cases, the UE 115 may store information related to the second CBG. For example, the UE 115 may store processing samples for the multi-level coded and modulated signal. The base station 105 may retransmit the first CBG in the next available slot based on the feedback. The UE 115 may attempt to decode the stored information related to the second CBG based on successful decoding of the first CBG after its retransmission.

Figure 2:
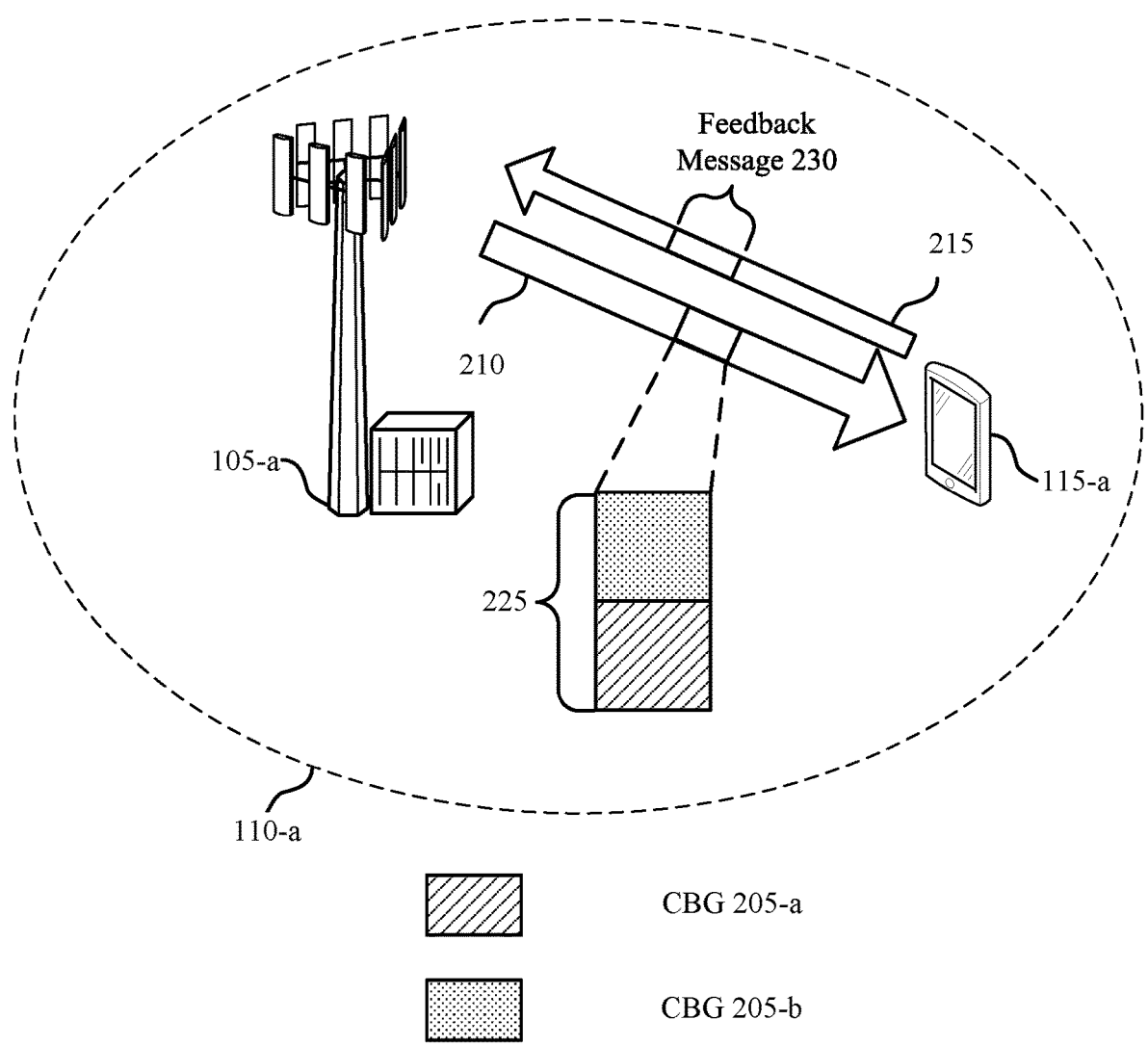

FIG. 2 illustrates an example of a wireless communications system 200 that supports hierarchical HARQ across decoding levels in accordance with aspects of the present disclosure. In some examples, the wireless communications system 200 may implement aspects of a wireless communications system 100. For example, wireless communications system 200 may include base station 105-*a* with coverage area 110-*a* and UE 115-*a*, which may be examples of a base station 105 and a UE 115 as described with reference to FIG. 1. Base station 105-*a* may implement a multi-level coding procedure to transmit one or more CBGs 205, each CBG including codeblocks associated with a same decoding level, via a downlink channel 210 to UE 115-*a*. Base station 105-*a*, UE 115-*a*, or both may communicate via downlink channel 210 or uplink channel 215. Although a base station 105 is shown for illustrative purpose, UE 115-*a* may communicate with various wireless devices, such as another UE 115, a repeater device, or other wireless devices.

In some cases, the wireless communications system 200 may use a multi-level coding scheme for transmitting a message that may be decoded according to a multi-level sequential demodulation and decoding procedure, which may improve spectral efficiency. For example, base station 105-*a* may encode a transmission to UE 115-*a* using a multi-level coding scheme. UE 115-*a* may receive the encoded transmission and may decode the transmission using sequential decoding of one or more decoding levels of the multi-level coding scheme. That is, UE 115-*a* may decode the transmission sequentially from the lowest decoding level to the highest. In some cases, UE 115-*a* may depend on the successful demodulation or decoding of the lower levels to decode the higher levels (i.e., there may be a dependency between a higher decoding level and the previous decoding level results).

The wireless communication system 200 may use a multi-level coding scheme with multi-level sequential demodulation and decoding to improve spectral efficiency. Multi-level coding with multi-level sequential demodulation and decoding on a receiver side may assume strong dependencies of demodulation/decoding of the higher decoding levels on the previous decoding level result (based on whether the previous coding level passed or failed). In some cases, the dependence of higher decoding (or partitioning) levels on the previous decoding/partitioning level may be high. As described herein, the multi-level coding scheme may use an Ungerboeck set partitioning to partition a modulation constellation into different constellation subsets while partitioning at different levels is protected by different component codes/decoding levels having different code rates to provide a different code protection for different partitioning levels correspondingly. In some examples, Ungerboeck set partitioning may gradually increase a minimum Euclidian distance between constellation points progressively with a partitioning steps (and coding levels correspondingly). For instance, the Ungerboeck set partitioning is intended to gradually increase a minimum Euclidian distance between constellation subsets while moving from a low partitioning level to a high partitioning level. Accordingly, the minimum Euclidian distance, and a corresponding code rate, may increase from a lowest coding level (component code) to a highest coding level. A coding level may be decoded using a component code that corresponds to the code rate aligned with the minimum Euclidian distance for the coding level. In some cases, a coding level may be referred to as a decoding level at a UE 115.

In some cases, a UE 115 may not successfully decode one or more higher decoding levels if the previous decoding level fails. In particular, in cases of multi-level coding with Ungerboeck set partitioning, decoding of a decoding level may be dependent on a successful decoding of a previous level. For example, if the UE 115 fails to accurately decode one or more codeblocks of a codeword associated with a first decoding level, the UE 115 may fail to decode one or more corresponding codeblocks of a codeword associated with a second decoding level. In some examples, failing to accurately decode one or more codeblocks of a codeword may include the codeword or codeblocks failing a CRC. In some cases, such a decoding level dependency may lead to error propagation of multilevel sequential decoding in receivers (e.g., the UE 115), that may result in retransmissions of codewords/codeblocks associated with multiple decoding levels which may cause to a lower link efficiency (e.g., due to retransmissions) in these cases as well as other inefficiencies in wireless communications system 200.

As described herein, hierarchical HARQ may be used during a multi-level sequential demodulation and decoding procedure (e.g., a coherent or non-coherent multi-level sequential demodulation and decoding procedure) to account for dependencies between different decoding levels. For example, a UE 115 may receive a transmission encoded according to multi-level coding scheme. The transmission may be divided into one or more CBGs 205, which may include one or more codeblocks associated with the corresponding one or more codewords. In some examples, each CBG 205 may be associated with a decoding level, such that all codeblocks of a given CBG 205 are associated with the same decoding level. The hierarchical HARQ may provide for gradual retransmission of a CBG 205 associated with a lowest failing decoding level.

In some cases, a CBG 205 may be defined to include codeblocks associated with codeword related to a single and the same decoding level. For example, base station 105-*a* may transmit an encoded transmission 225 to UE 115-*a*. The encoded transmission 225 may include one or more CBGs 205 (e.g., CBG 205-*a* and CBG 205-*b*) on the same channel resource. Although two CBGs 205 are shown in FIG. 2, an encoded transmission 225 may include any number of CBGs 205. In some examples, three or more CBGs 205 (associated with three or more decoding levels, respectively) may be used for a multi-level transmission. In some cases, CBG 205-*a* may include codeblocks associated with codewords related to the first decoding level while CBG 205-*b* may include codeblocks associated with codewords from a different (e.g., second) decoding level, which is described in further detail with respect to FIG. 3. In some cases, the time-frequency resources used by codeblocks associated with CBG 205-*a* and codeblocks associated with CBG 205-*b* may be the same across decoding levels. For example, the resource elements spanned by codeblocks associated with CBG 205-*a* and the resource elements spanned by codeblocks associated with CBG 205-*b* may be the same. Thus, the codeblocks associated with different decoding levels may be coupled together on the same resources (e.g., time-frequency resources), but may be related to different CBGs 205.

In some examples, UE 115-*a* may receive encoded transmission 225 and may attempt to decode CBG 205-*a*, which may be associated with a lower decoding level than CBG 205-*b*. UE 115-*a* may successfully decode codeblocks from CBG 205-*a* and codeblocks from CBG 205-*b*. For example, the codeblocks may pass a CRC. UE 115-*a* may report an acknowledgement (ACK) for CBG 205-*a* and CBG 205-*b* to base station 105-*a* in feedback message 230 via uplink channel 215, so base station 105-*a* may not retransmit CBG 205-*a* or CBG 205-*b*. In some other examples, UE 115-*a* may successfully decode codeblocks associated with CBG 205-*a*, but may fail to decode one or more codeblocks associated with CBG 205-*b*. UE 115-*a* may report an ACK for CBG 205-*a* in feedback message 230 but may report a NACK for CBG 205-*b*. Base station 105-*a* may retransmit codeblocks associated with CBG 205-*b*. For example, an additional redundancy version for codeblocks associated with CBG 205-*b* may be retransmitted coupled to a new codeword (carrying a new data) for the lower decoding level bits. In some cases, the new codeword/CBG may be indicated in downlink control information (DCI) by a new data indicator (NDI). In some other examples, UE 115-*a* may fail to decode one or more of codeblocks associated with CBG 205-*a* and consequently CBG 205-*a*. Due to the decoding level dependency, UE 115-*a* may also fail to decode CBG 205-*b*. UE 115-*a* may transmit a NACK to base station 105-*a* for CBG 205-*a* and CBG 205-*b* in feedback message 230. In some cases, UE 115-*a* may store post processing samples to be used for a later attempt of decoding of CBG 205-*b* once successful decoding of CBG 205-*a* will be obtained after one or more retransmissions and will allow to get a reliable partitioning information for CBG 205-*d* demodulation and decoding. Base station 105-*a* may first retransmit codeblocks associated with CBG 205-*a*. For example, an additional redundancy version for codeblocks of CBG 205-*a* may be retransmitted coupled with new codewords (carrying a new data) for the higher decoding level bits, which will be described in further detail herein, for example with reference to FIGS. 3 and 4.

In some cases, performing a hierarchical HARQ procedure (e.g., transmitting feedback message 230 based on decoding failure of codewords (e.g., one or more codeblocks of a codeword) of CBG 205-*a* and CBG 205-*b* may be based on a capability of UE 115-*a*. For example, performing a hierarchical HARQ procedure may be based on a capability of UE 115-*a* to store frequency domain resource elements. In some cases, UE 115-*a* may indicate to base station 105-*a* whether UE 115-*a* supports hierarchical HARQ.

For example, UE 115-*a* may transmit, to base station 105-*a*, an indication of a capability of UE 115-*a* to support a maximum number of hierarchical HARQ buffers associated with the number of hierarchical HARQ processes. In some cases, a processing capability may be defined indicating a maximum number of frequency domain resource element buffers supported by UE 115-*a*. If UE 115-*a* reaches a maximum processing capability in terms of a number of hierarchical HARQ processes, base station 105-*a* may start to repeat RV0 transmissions of codeblocks/CBGs associated with decoding levels higher than the lowest failing decoding level (this will assume that UE is not able to allocate additional buffers for post processing samples for the failing or not attempted for decoding CBGs of the higher decoding levels). Base station 105-*a* may transmit control signaling to UE 115-*a* indicating UE 115-*a* may handle the retransmitted codeblocks/CBGs (with the same RV0 every time) as a new set of codeblocks/CBGs (no previously buffered data to be associated/used). In these cases, base station 105-*a* may send also an indication to UE 115-*a* to discard previously received codeblocks/CBGs (will allow to avoid increasing the number of involved sample buffers further). In some cases, the indications may be sent in a DCI message. In some cases, such as when a peak processing load related to decoding of multiple higher decoding level CBGs 205 based on stored post processing samples is relatively high (e.g., once a lower level decoding succeeds after one or more retransmissions of the related CBG), UE 115-*a* may report a NACK for a CBG 205-*b* indicating that UE 115-*a* did not finish processing and may transmit an indication that the first decoding level codeblocks/CBG 205-*a* were decoded successfully. UE 115-*a* may preserve the data stored as part of the hierarchical HARQ procedure and proceed to decode the unprocessed codeblocks on the nearest opportunity once some processing resources will be available on the UE side for this purpose. UE 115-*a* may transmit an ACK message once all the remaining decoding levels are successfully decoded.

In some cases, once a hierarchical HARQ processing capability (number of hierarchical HARQ buffers) is reached at a UE 115, a base station 105 may switch to a more traditional HARQ procedure for decoding levels. One or more flags may be indicated in a scheduling DCI associated with repeating of the transmission of the CBG 205-*b* at the lowest redundancy version. For example, the base station 105 may set an NDI for the second decoding level to signal that codeblocks for the CBG 205-*b* of the second decoding level (including repetition of the previously sent revision) is to be addressed as a new data. Additionally or alternatively, the base station 105 may set a CBG flushing out information flag for second coding level related CBG 205-*b* to 1, which indicates that the previous hierarchical HARQ process buffer used for samples related to codeblocks of this CBG (associated with the second decoding level) should be discarded by the UE 115-*a*.

Figure 3:
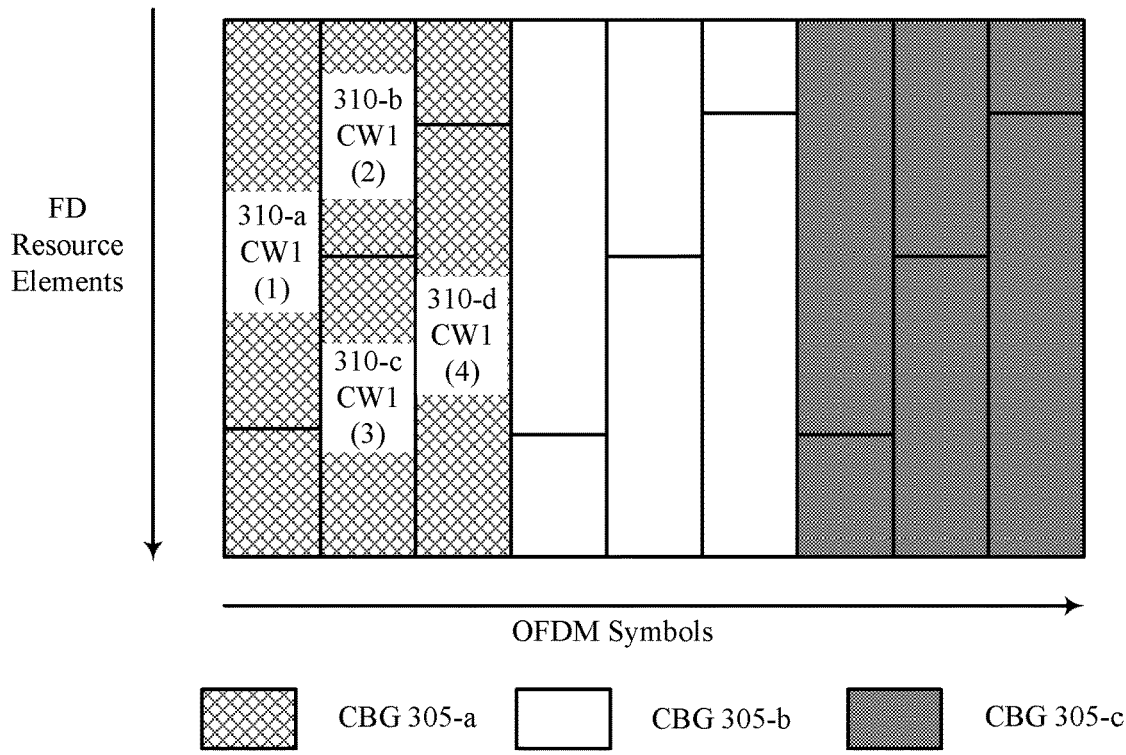
FIG. 3 illustrates an example of a multi-level coding scheme that supports hierarchical HARQ for multi-level coding with multi-level sequential demodulation and decoding and code block grouping per decoding level in accordance with aspects of the present disclosure.
Figure 3:
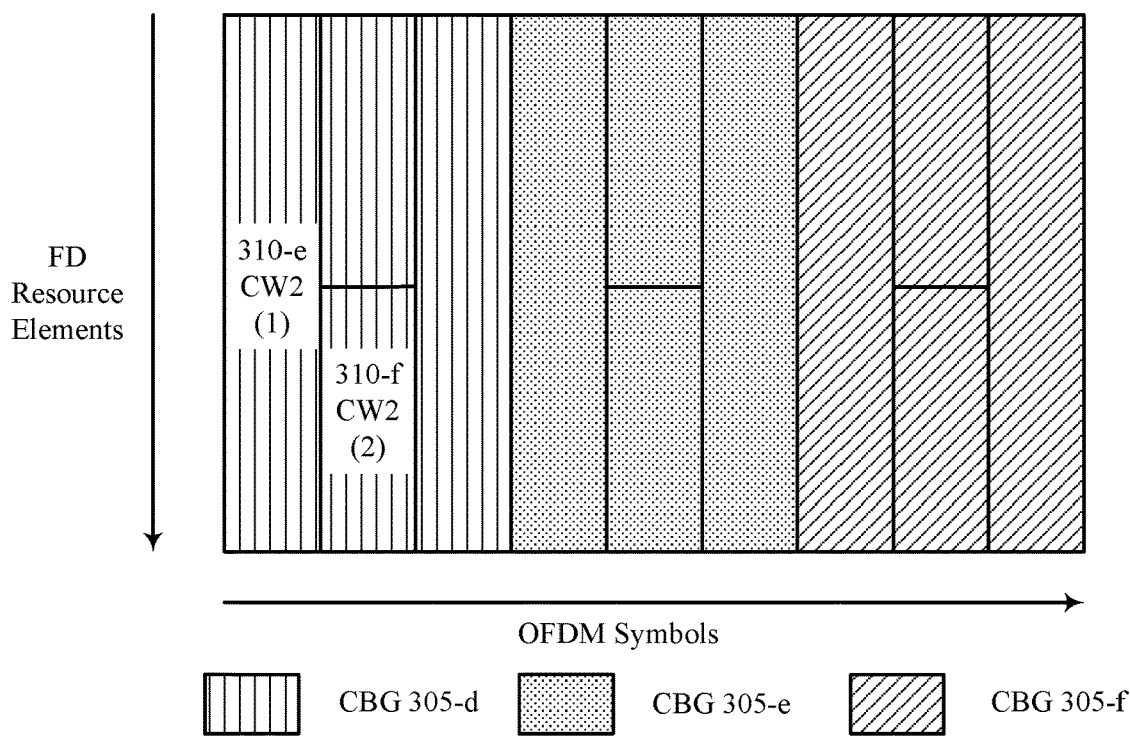

FIG. 3 illustrates an example of a multi-level coding scheme 300 that supports hierarchical HARQ across decoding levels in accordance with aspects of the present disclosure. In some examples, the multi-level coding scheme 300 may implement aspects of a wireless communications systems 100 or 200. For example, the multi-level coding scheme 300 may be implemented by a UE 115, a base station 105, or both in combination with hierarchical HARQ (e.g., decoding level based feedback messages) to reduce a volume of transmissions. In some cases, a CBG 305 may include one or more codeblocks 310, each codeblock associated with a codeword. In some cases, the codeword may be associated with a decoding, or coding, level, such that each codeword is associated with a decoding level of the multi-level coding and multi-level sequential demodulation and decoding procedure. For example, the first coding level codeword mapping may include CBG 305-*a*, CBG 305-*b*, and CBG 305-*c* associated with a first codeword from a first coding level (CW1) while the second coding level codeword mapping may include CBG 305-*d*, CBG 305-*e*, and CBG 305-*f* associated with a second codeword from a second coding level different from the first coding level (CW2). In some examples, CBG 305-*a*, associated with the first codeword from the first coding level, may include codeblock 310-*a* through codeblock 310-*d*. CBGs 305-*b* and CBG 305-*c*, also associated with the first codeword from the first coding level, may also include four codeblocks 310. For the second codeword from the second coding level, CBG 305-*d* may include two codeblocks 310-*e* and 310-*f*. CBG 305-*e* and CBG 305-*f*, also associated with the second codeword from the second coding level, may also each include two codeblocks 310. Although three CBGs 305 are shown per coding level codeword mapping in FIG. 3, any number of CBGs 305 may be included in each coding level codeword mapping.

In some examples, the number of resource elements spanned by codeblocks 310 associated with CW1 and codeblocks 310 associated with CW2 may be the same. In some cases, a number of codeblocks associated with CW1 plus a number of codeblocks associated with CW2 may be coupled together on the same resources, but may be related to different CBGs 305 for HARQ procedures (e.g., feedback reporting). In some cases, CW1 related codeblocks (i.e., codeblocks associated with the first decoding level) may be shorter in length than CW2 codeblocks (i.e., codeblocks associated with the second decoding level). In some examples, the difference in codeblocks length may reduce latency when a UE performs multi-level sequential demodulation and decoding.

In some examples, the number of resource elements spanned by codeblocks 310 associated with CW1 and codeblocks 310 associated with CW2 may be the same. In some cases, a number of codeblocks associated with CW1 plus a number of codeblocks associated with CW2 may be coupled together on the same resources, but may be related to different CBGs 305 for HARQ procedures (e.g., feedback reporting). In some cases, CW1 related codeblocks (i.e., codeblocks associated with the first decoding level) may be shorter in length than CW2 codeblocks (i.e., codeblocks associated with the second decoding level). In some examples, the difference in codeblocks length may reduce latency when a UE performs multi-level sequential demodulation and decoding.

In some examples, a base station 105 may transmit CBG 305-*a* during a slot N to a UE 115. The UE 115 may fail to decode one or more of codeblock 310-*a* through codeblock 310-*d* during the slot N. In some cases, the UE 115 may fail to decode CBG 305-*a* due to the failure of the one or more codeblocks 310. The UE 115 may rely on the successful decoding of CBG 305-*a* to decode CBG 305-*d* due to the multi-level coding scheme (e.g., error propagation effect). Accordingly, the UE 115 may store samples associated with CBG 305-*d* to use once CBG 305-*a* is successfully decoded (e.g., code protected partitioning information that may be used to improve a decoding success rate for higher decoding levels). That is, the UE 115 may pause decoding CBG 305-*d* after a decoding failure (e.g., one or more CRC errors for codeblocks 310) on a previous decoding level, such as for CBG 305-*a*, and may store information/samples related to CBG 305-*d*. The UE 115 may report a NACK for CBG 305-*a* and CBG 305-*b* in a feedback message to the base station 105. In response to receiving the NACK, the base station 105 may retransmit CW1 codeblocks 310 for CBG 305-*a* during a slot N+K. The base station 105 may transmit new data in CBG 305-*d* during the slot N+K (e.g., if the UE 115 stores prior data for CBG 305-*d* transmitted in slot N).

In some cases, the receiving device may decode codeblock 310-*a* through codeblock 310-*d* associated with CW1 successfully after the first retransmission. That is, the UE 115 may decode CBG 305-*a* without CRC errors during slot N+K. If CBG 305-*a* is decoded successfully, the UE 115 may decode the new data for CBG 305-*d* transmitted in slot N+K. Additionally, the receiving device may attempt to decode the stored data associated with the prior transmission of CBG 305-*d* using code protected partitioning information associated with the first decoding level. If the UE 115 successfully decodes CBG 305-*a* and CBG 305-*d* on slot N+K, the UE 115 may transmit an ACK message for CBG 305-*a* and CBG 305-*d* to the base station 105. If the UE 115 fails to decode CBG 305-*a*, CBG 305-*d*, or both again on slot N+K, the UE 115 may transmit a NACK message to the base station 105. In some examples, retransmissions may continue until CBG 305-*a* is successfully decoded or until a maximum number of retransmissions is reached, at which time the process may be restarted. Each retransmission of the first decoding level CBG 305 may come with a new set of data on the corresponding second level CBG 305. Performing a hierarchical HARQ procedure may reduce the number of CBGs 305, codewords, or both that are retransmitted by a base station 105. Various aspects of hierarchical HARQ procedures are further described with reference to FIGS. 4-6.

Figure 4:
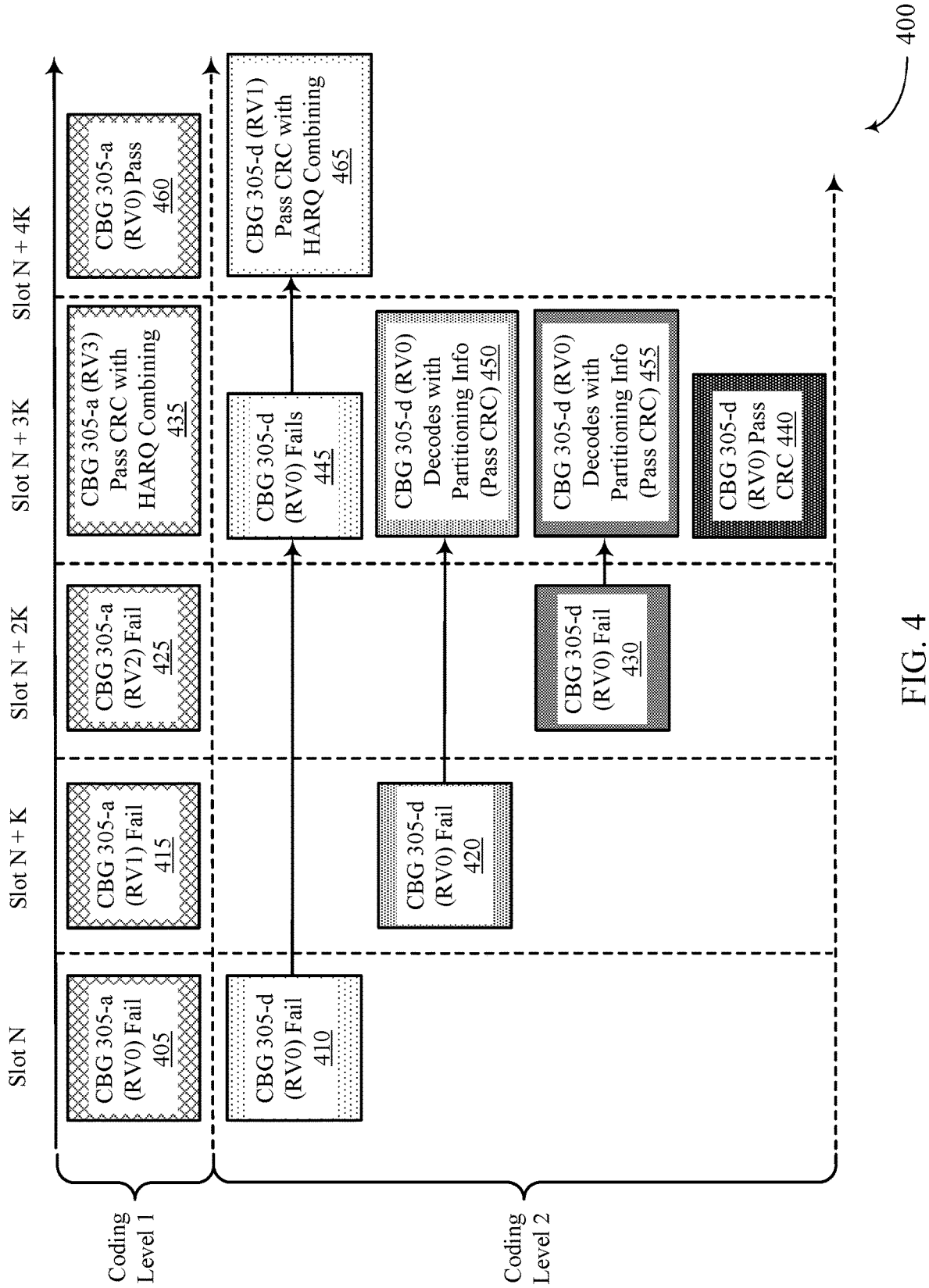
FIG. 4 illustrates an example of a processing timeline that supports hierarchical HARQ for multi-level coding with multi-level sequential demodulation and decoding and code block grouping per decoding level in accordance with aspects of the present disclosure.

FIG. 4 illustrates an example of a processing timeline 400 that supports hierarchical HARQ across decoding levels, in accordance with one or more aspects of the present disclosure. In some examples, the processing timeline 400 may implement aspects of a wireless communications system 100 or 200 as well as multi-level coding scheme 300. For example, the processing timeline 400 may be implemented by a UE 115 (or receiving device), a base station 105 (or transmitting device), or both in combination with hierarchical HARQ (e.g., decoding level based feedback messages) to reduce a volume of transmissions.

During a slot N, at 405, a base station 105 may transmit an initial redundancy version (RV0) of CBG 305-*a*, which may include codeblocks associated with codeword from a first decoding level (e.g., decoding level 1), and, at 410, an RV0 of CBG 305-*d*, which may include codeblocks associated with codeword of a second decoding level (e.g., decoding level 2). In some examples, CBG 305-*a* may be associated with a first decoding level and CBG 305-*d* may be associated with a second decoding level, such that all codeblocks of a given CBG 305 are associated with the same decoding level. CBG 305-*a* and CBG 305-*d* may be examples of CBGs 305 as described with reference to FIG. 3. In some examples, three or more CBGs 305 (associated with three or more decoding levels, respectively) may be used for a multi-level transmission. In some examples, the UE 115 may attempt to decode CBG 305-*a* and CBG 305-*d* during slot N. The UE 115 may fail to decode one or more codeblocks associated with CBG 305-*a* (e.g., due to one or more codeblocks associated with failing a CRC). The UE 115 may store post processing samples associated with CBG 305-*d* from slot N, put a decoding procedure for CBG 305-*d* from slot N on hold, and may transmit a NACK for CBG 305-*a*, CBG 305-*d*, or both from slot N to the base station 105.

At 415 during slot N+K, the base station 105 may retransmit a first redundancy version (RV1) associated with a set of codeblocks included in of CBG 305-*a* and, at 420, an RV0 with codeblocks included in CBG 305-*d* associated with new codeword of the decoding level 2 and new data. In some cases, the UE 115 may still fail to decode RV1 of CBG 305-*a* after performing HARQ combining. Thus, the UE 115 may store post processing samples associated with CBG 305-*d* from slot N+K, put a decoding procedure for CBG 305-*d* from slot N+K on hold (e.g., during slot N+K), and may transmit a NACK for CBG 305-*a*, CBG 305-*d*, or both from slot N+K. At 425 during slot N+2K, the base station 105 may retransmit a second redundancy version (RV2) of CBG 305-*a* and, at 430, an RV0 of CBG 305-*d* from slot N+2K with new codeblocks associated with decoding level 2 and new data. In some cases, the UE 115 may still fail to decode RV2 of CBG 305-*a* after performing HARQ combining. Thus, the UE 115 may store post processing samples associated with CBG 305-*d* from slot N+2K, put a decoding procedure for CBG 305-*d* associated with slot N+2K on hold, and may transmit a NACK for CBG 305-*a*, CBG 305-*d*, or both from slot N+2K.

At 435 during slot N+3K, the base station 105 may retransmit a third redundancy version (RV3) of CBG 305-*a* and, at 440, an RV0 of CBG 305-*d* with new codeblocks associated with decoding level 2 and new data. In some cases, the UE 115 may successfully decode RV3 of CBG 305-*a* after performing HARQ combining. The UE 115 may subsequently successfully decode the RV0 of CBG 305-*d* from slot N+3K. In addition given the successful decoding of the CBG 305-*a* after retransmissions, the UE 115 may regenerate redundancy versions, including those corresponding to the retransmissions on slots N, N+K, N+2K, N+3K, and may determine code protected partitioning information for the decoding level 2 demodulation and decoding on slots N, N+K, N+2K and N+3K. Then the receiving device may attempt to decode the sets of codeblocks or codewords based on the stored post processing samples corresponding to resources spanned by this set of code blocks from slots N, N+K, and N+2K. For example, the codeblocks associated with RV3 of CBG 305-*a* and CBG 305-*d* from slot N+3K may pass a CRC. The UE 115 may use partitioning information from successfully decoding of CBG 305-*a* and regeneration of its RV1, RV2 to decode the stored information for CBG 305-*d* from slot N+2K, CBG 305-*d* from slot N+K, or both. However, the post processing samples stored from CBG 305-*d* from slot N may still fail a CRC. Thus, the UE 115 may transmit a NACK for CBG 305-*d* from slot N.

At 460 during slot N+4K, the base station 105 may transmit an RV0 of CBG 305-*a* associated with codeword from coding level 1 as well as an RV1 of the stored information associated with CBG 305-*d* from slot N. The UE 115 may successfully decode RV0 of CBG 305-*a*. The UE 115 may attempt to decode the retransmission RV1 of the CBG 305-*d* from slot N based on HARQ combining with its RV0 from slot N based on the successful decoding of RV0 of CBG 305-*a*. The UE 115 may send an ACK message for slots N and N+4K. In some cases, the number of coding levels, the number of slots, or both the UE 115 may keep on hold may be defined in a UE capability report.

Figure 5:
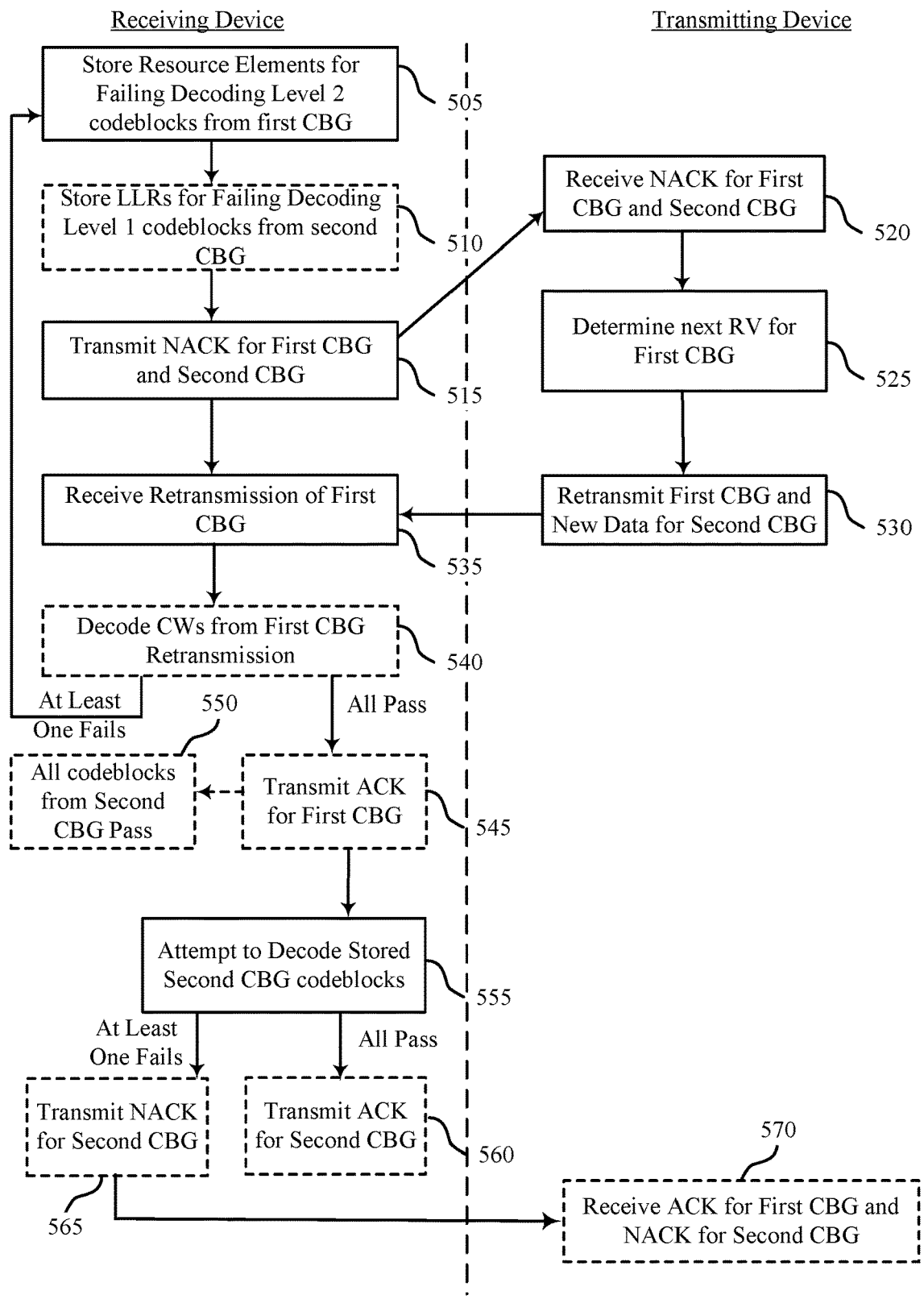
FIG. 5 illustrates an example of a process flow that supports hierarchical HARQ for multi-level coding with multi-level sequential demodulation and decoding and code block grouping per decoding level in accordance with aspects of the present disclosure.

FIG. 5 illustrates an example of a process flow 500 that supports hierarchical acknowledgement across decoding levels, in accordance with one or more aspects of the present disclosure. In some examples, the process flow 500 may implement aspects of a wireless communications system 100 or 200 as well as multi-level coding scheme 300 or processing timeline 400. The processing timeline 400 may illustrate an example of a UE 115 or a base station 105 performing a hierarchical HARQ procedure based on a receiving device (e.g., a UE 115) failing to decode one or more CBGs. Alternative examples of the following may be implemented, where some processes are performed in a different order than described or are not performed. In some cases, processes may include additional features not mentioned below, or further processes may be added.

In some cases, a UE 115 may receive a transmission during a first time period, such as a slot, on a set of channel resources from a base station 105. The transmission may include one or more CBGs. For example, the transmission may include a first CBG and a second CBG. Each CBG may include one or more codeblocks associated with a decoding level. The base station 105 may encode the first CBG and the second CBG according to a multi-level coding procedure. In some cases, the first CBG may include codeblocks associated with a decoding level 1 and the second CBG may include codeblocks associated with a decoding level 2 that is higher than decoding level 1 (i.e., decoding level 1 is lower than decoding level 2). In some cases, decoding level 1 may be decoded prior to decoding level 2. In some cases, decoding level 1 may have shorter codeblocks than decoding level 2. The UE 115 may attempt to decode the first CBG, however the decoding procedure of one or more related to this CBG codeblocks may fail (e.g., a CRC may fail). Thus, the UE 115 may determine the decoding procedure associated with the first CBG is unsuccessful. At 505, the UE 115 may store post processing samples (e.g., frequency domain samples related to resource elements spanned by the failing codeblocks) to be addressed for the second CBG demodulation and decoding procedure, while the second CBG is associated with decoding level 2. In some cases, at 510, the UE 115 may store log-likelihood ratios (LLRs) for the failing decoding level 1 codeblocks from the first CBG. The UE 115 may use the LLRs to combine with the next HARQ session for the decoding level 1 codeblocks from the first failing CBG.

At 515, the UE 115 may transmit a feedback message (e.g., a NACK) for the first CBG and the second CBG to the base station 105. At 520, the base station 105 may receive the NACK for the first CBG and the second CBG. At 525, the base station 105 may determine the next redundancy version for the codewords associated with the first CBG. At 530, the base station 105 may transmit a retransmission of information related to the first CBG (e.g., codeblocks for the first CBG) and new data on the second CBG to UE 115 in a second time period in response to receiving the feedback message from UE 115. In some cases, the base station 105 may couple the retransmitted codeblocks for the first CBG with decoding level 2 related codeblocks or corresponding CBG defined with aa new data bits. Thus, in some cases, the UE 115 may receive new data on the second CBG including one or more codeblocks associated with decoding level 2 with the retransmission of the first CBG.

At 535, the UE 115 may receive the retransmission of the first CBG during a second time period (e.g., a different slot) based on transmitting the NACK. In some cases, the UE 115 may determine the message is a retransmission of the first CBG based on DCI. At 540, the UE 115 may decode codeblocks of the first CBG based on retransmission and using HARQ buffer combining with the next redundancy version LLRs. If one or more of the codeblocks fails a CRC, the process may return to 505. At 545, if the codeblocks from the first CBG pass the CRC, the UE 115 may transmit an ACK for the first CBG from the corresponding slot, HARQ identifier, or both. The base station 105 may receive the ACK and may determine to transmit new data for decoding level 1 during the next slot based on the ACK. In some examples, such as at 550, the UE 115 may successfully decode the new data on the second CBG. In some other examples, the UE 115 may fail to decode the new data on the second CBG. The UE 115 may transmit an ACK or a NACK based on successfully decoding or failing to decode, respectively, the new data on the second CBG. If the decoding fails for the second CBG, the UE 115 may store an LLR buffer for the second CBG. On the next available slot, the base station 105 may transmit the first CBG with new data and the next redundancy version of the second CBG (e.g., RV1). The UE 115 may attempt to decode the RV1 second CBG using HARQ combining of RV1 LLRs and the corresponding LLR buffers from previous redundancy versions (e.g., RV0).

At 555, the UE 115 may attempt to decode the second CBG from the first time period using the stored post processing samples and based on the successful decoding of the first CBG. For example, the UE 115 may determine a code protected partitioning information based on decoding the first CBG. The UE 115 may attempt to decode the second CBG based on the partitioning information and the associated with it stored post processing samples. In some cases, the UE 115 may successfully decode the second CBG using the stored samples and, at 560, may transmit an ACK for the second CBG from the first time period to the base station 105. In some other cases, the UE 115 may fail to decode the second CBG based on the stored samples corresponding to its RV0 transmission. At 565, the UE 115 may transmit a feedback message (e.g., a NACK) including an indication that the decoding procedure was unsuccessful for the second CBG from the first time period. At 570, the base station 105 may receive the ACK for the first CBG and the NACK for the second CBG. In some cases, the base station 105 may transmit a new transmission (with new data) of the first CBG including one or more codeblocks associated with decoding level 1 and a retransmission with the next redundancy version (e.g., RV1) of the second CBG during a third time period based on the NACK for the second CBG and ACK for the first CBG from the UE 115. Assuming that the UE 115 successfully decodes the new data on the first CBG from the third time period, the UE 115 may it can re-attempt decoding of the second CBG with its retransmission. The UE 115 may decode the second CBG based on the retransmission and LLRs combining with LLRs of RV0 of the second CBG. For example, the UE 115 may attempt to decode the next redundancy version (e.g., RV1) of the second CBG using HARQ combining of the next redundancy version LLRs (e.g., RV1 LLRs) and the corresponding LLR buffers from previous redundancy versions (e.g., RV0).

In some examples, the UE 115 may transmit an indication of a capability of the UE 115 to support hierarchical HARQ and a number of HARQ processes across one or more decoding levels to the base station 105. Additionally or alternatively, the UE 115 may transmit an indication of a capability of the UE 115 to support a maximum number of hierarchical HARQ buffers associated with the number of hierarchical HARQ processes.

Figure 6:
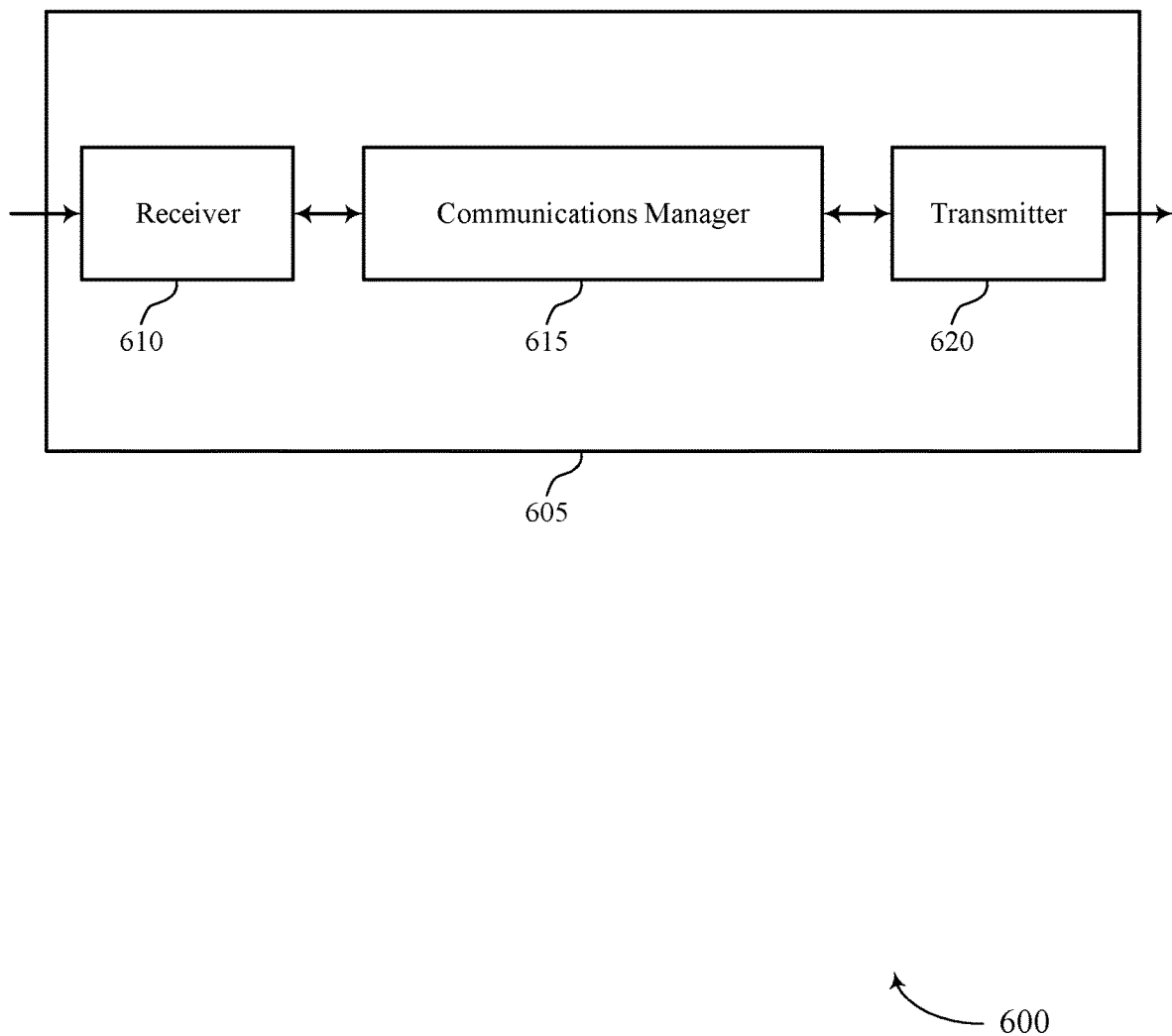
FIGS. 6 and 7 show block diagrams of devices that support hierarchical HARQ for multi-level coding with multi-level sequential demodulation and decoding and code block grouping per decoding level in accordance with aspects of the present disclosure.

FIG. 6 shows a block diagram 600 of a device 605 that supports hierarchical HARQ for multi-level coding with multi-level sequential demodulation and decoding and code block grouping per decoding level in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to hierarchical HARQ for multi-level coding with multi-level sequential demodulation and decoding and code block grouping per decoding level, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station in a first time period and on a same set of channel resources, a multi-level coded and modulated signal including at least a first CBG and a second CBG corresponding to the first CBG, the first CBG including a first set of codeblocks and the second CBG including a second set of codeblocks, each codeblock of the first set of codeblocks associated with a first decoding level of the multi-level coded and modulated transmission and each codeblock of the second set of codeblocks associated with a second decoding level of the multi-level coded transmission, where the first decoding level is lower than the second decoding level, and the first decoding level is to be decoded prior to decoding of the second decoding level and determine that a decoding procedure associated with the first CBG is unsuccessful.

The communications manager 615 may store post processing samples for the multi-level coded and modulated signal, transmit, to the base station, a feedback message including an indication that the decoding procedure was unsuccessful for the first CBG and the second CBG, receive, from the base station in a second one or more time periods and in response to the transmitted feedback message, one or more retransmissions of the first CBG, successfully decode the first CBG based on the first CBG from the first time period and the one or more retransmissions of the first CBG from the second one or more time periods, and attempt to decode the second CBG from the first time period using the stored post processing samples and based on the successful decoding of the corresponding first CBG. The communications manager 615 may be an example of aspects of the communications manager 910 described herein.

The actions performed by the communications manager 615 as described herein may be implemented to realize one or more potential advantages. One implementation may enable a UE to receive a retransmission of a CBG based on transmitting a feedback message for one or more CBGs that have been encoded according to a multi-level coding scheme. The retransmission of the CBG may enable a UE to decode a stored CBG (the corresponding post processing samples) and a new CBG associated with a higher decoding level based on the retransmission, which may reduce the volume of retransmitted data, among other advantages.

Based on implementing the hierarchical HARQ procedure as described herein, a processor of a UE or a base station (e.g., a processor controlling the receiver 610, the communications manager 615, the transmitter 620, or a combination thereof) may reduce the impact or likelihood of inefficient resource utilization due to multi-level sequential demodulation and decoding procedure retransmissions while ensuring relatively efficient communications. For example, the hierarchical HARQ techniques described herein may leverage storing a CBG at the UE after unsuccessfully decoding a lower decoding level CBG, which may realize reduced volume of retransmissions and a better channel resources utilization, among other benefits.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signaling processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
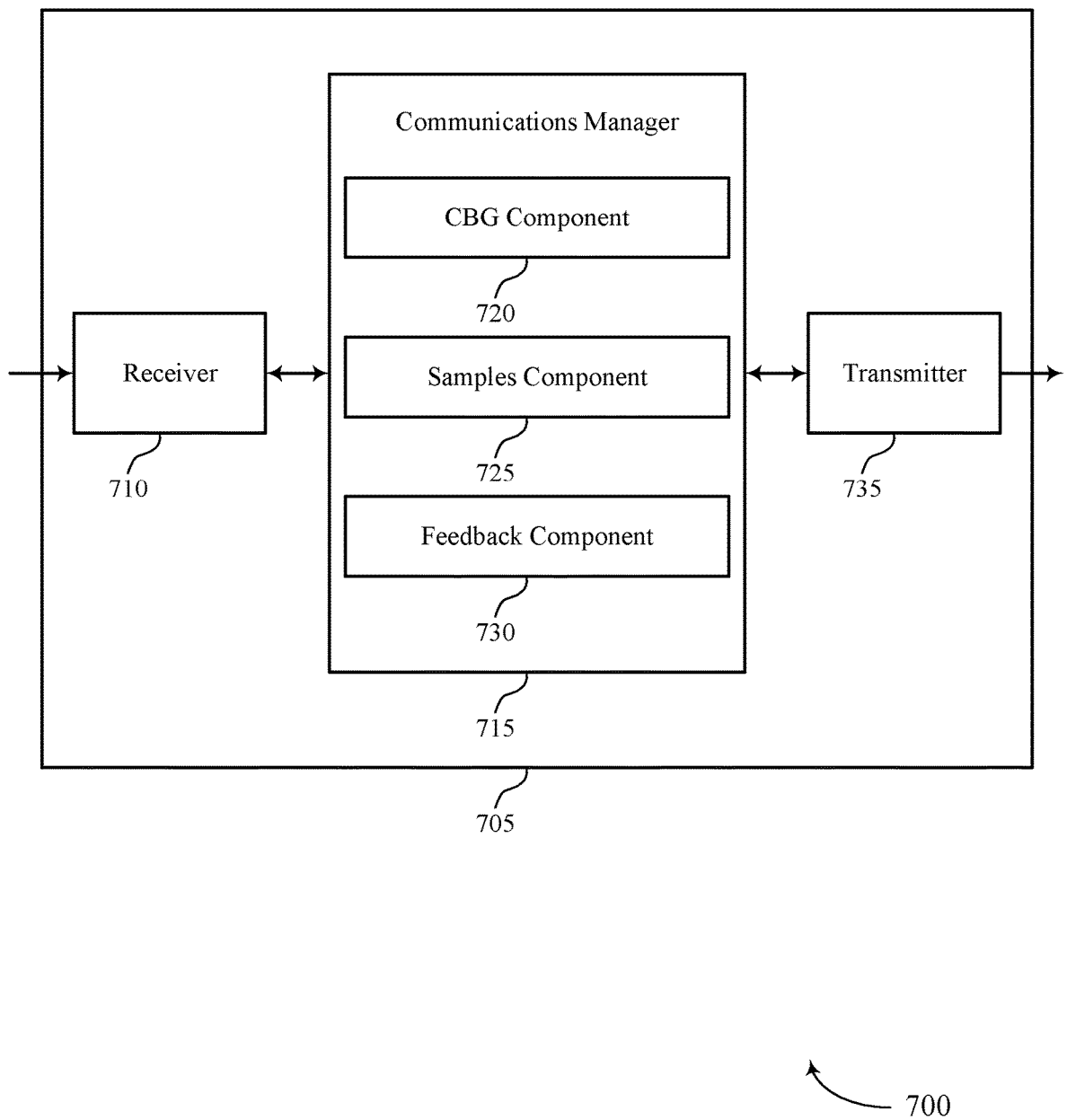

FIG. 7 shows a block diagram 700 of a device 705 that supports hierarchical HARQ for multi-level coding with multi-level sequential demodulation and decoding and code block grouping per decoding level in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to hierarchical HARQ for multi-level coding with multi-level sequential demodulation and decoding and code block grouping per decoding level, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a CBG component 720, a samples component 725, and a feedback component 730. The communications manager 715 may be an example of aspects of the communications manager 910 described herein.

The CBG component 720 may receive, from a base station in a first time period and on a same set of channel resources, a multi-level coded and modulated signal including at least a first CBG and a second CBG corresponding to the first CBG, the first CBG including a first set of codeblocks and the second CBG including a second set of codeblocks, each codeblock of the first set of codeblocks associated with a first decoding level of the multi-level coded and modulated transmission and each codeblock of the second set of codeblocks associated with a second decoding level of the multi-level coded transmission, where the first decoding level is lower than the second decoding level, and the first decoding level is to be decoded prior to decoding of the second decoding level and determine that a decoding procedure associated with the first CBG is unsuccessful.

The samples component 725 may store post processing samples for the multi-level coded and modulated signal. The feedback component 730 may transmit, to the base station, a feedback message including an indication that the decoding procedure was unsuccessful for the first CBG and the second CBG. The CBG component 720 may receive, from the base station in a second one or more time periods and in response to the transmitted feedback message, one or more retransmissions of the first CBG and successfully decode the first CBG based on the first CBG from the first time period and the one or more retransmissions of the first CBG from the second one or more time periods. The samples component 725 may attempt to decode the second CBG from the first time period using the stored post processing samples and based on the successful decoding of the corresponding first CBG.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
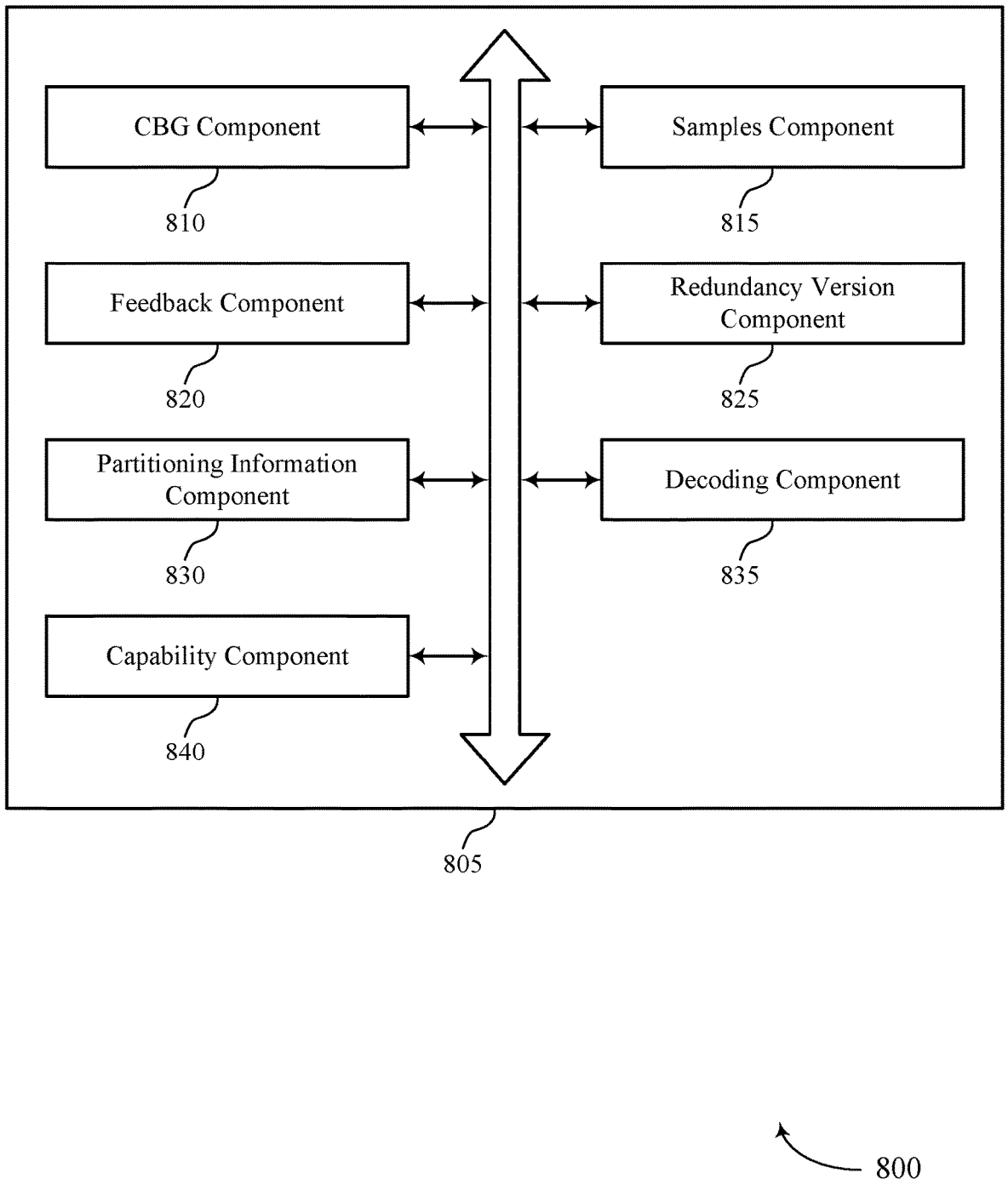
FIG. 8 shows a block diagram of a communications manager that supports hierarchical HARQ for multi-level coding with multi-level sequential demodulation and decoding and code block grouping per decoding level in accordance with aspects of the present disclosure.

FIG. 8 shows a block diagram 800 of a communications manager 805 that supports hierarchical HARQ for multi-level coding with multi-level sequential demodulation and decoding and code block grouping per decoding level in accordance with aspects of the present disclosure. The communications manager 805 may be an example of aspects of a communications manager 615, a communications manager 715, or a communications manager 910 described herein. The communications manager 805 may include a CBG component 810, a samples component 815, a feedback component 820, a redundancy version component 825, a partitioning information component 830, a decoding component 835, and a capability component 840. Each of these modules may communicate, directly or indirectly, with one another (e.g., via one or more buses).

The CBG component 810 may receive, from a base station in a first time period and on a same set of channel resources, a multi-level coded and modulated signal including at least a first CBG and a second CBG corresponding to the first CBG, the first CBG including a first set of codeblocks and the second CBG including a second set of codeblocks, each codeblock of the first set of codeblocks associated with a first decoding level of the multi-level coded and modulated transmission and each codeblock of the second set of codeblocks associated with a second decoding level of the multi-level coded transmission, where the first decoding level is lower than the second decoding level, and the first decoding level is to be decoded prior to decoding of the second decoding level.

In some examples, the CBG component 810 may determine that a decoding procedure associated with the first CBG is unsuccessful. The samples component 815 may store post processing samples for the multi-level coded and modulated signal. The feedback component 820 may transmit, to the base station, a feedback message including an indication that the decoding procedure was unsuccessful for the first CBG and the second CBG. In some examples, the CBG component 810 may receive, from the base station in a second one or more time periods and in response to the transmitted feedback message, one or more retransmissions of the first CBG. In some examples, the CBG component

810 may successfully decode the first CBG based on the first CBG from the first time period and the one or more retransmissions of the first CBG from the second one or more time periods. In some examples, the samples component 815 may attempt to decode the second CBG from the first time period using the stored post processing samples and based on the successful decoding of the corresponding first CBG.

In some examples, the CBG component 810 may receive, from the base station in at least one of the second one or more time periods, a transmission of a new set of codeblocks for the second CBG. In some examples, the CBG component 810 may receive, from the base station in a third time period, a transmission of a new set of data for the first CBG. In some examples, the CBG component 810 may receive, from the base station in the third time period, a retransmission of the second CBG. In some examples, the CBG component 810 may attempt to decode the retransmission of the second CBG based on the successful decoding of the new data for the first CBG and based on LLRs combining for the first transmission and retransmission of the second CBG.

In some examples, the feedback component 820 may transmit, to the base station in response to successfully decoding the first CBG based on the one or more retransmissions of the first CBG, a second feedback message including an indication that the decoding procedure was successful for the first CBG. In some examples, the feedback component 820 may transmit, to the base station, a second feedback message including an indication that the decoding procedure was unsuccessful for the second CBG transmitted in the first time period. In some examples, the feedback component 820 may transmit, to the base station, a third feedback message including an indication that the decoding procedure was successful for the first CBG from the third time period. In some examples, the feedback component 820 may transmit, to the base station, a fourth feedback message including an indication that the decoding procedure was successful for the second CBG from the first time period based on the stored post processing samples and LLRs combining of the second CBG transmitted in the first time period and the retransmission of the second CBG in the third time period. In some examples, the feedback component 820 may transmit a NACK message for the first CBG and the second CBG.

The redundancy version component 825 may regenerate a corresponding redundancy version for the first set of codeblocks from the first code block group and associated with the first decoding level from the first transmission period. The partitioning information component 830 may determine partitioning information based on the successful decoding the first CBG and the regenerated redundancy version. In some examples, the partitioning information component 830 may attempt to decode the second CBG from the first time period based on the partitioning information.

The decoding component 835 may determine the first decoding level has shorter or same length codeblocks compared to the second decoding level. The decoding component may determine the first decoding level has longer codeblocks than the second decoding level.

The capability component 840 may transmit, to the base station, an indication of a capability of the UE to support hierarchical acknowledgment feedback and a number of HARQ processes across a set of decoding levels, where receiving the retransmission of the first CBG transmitted with a new data transmission for the corresponding second code block group is based on the transmitted indication.

Figure 9:
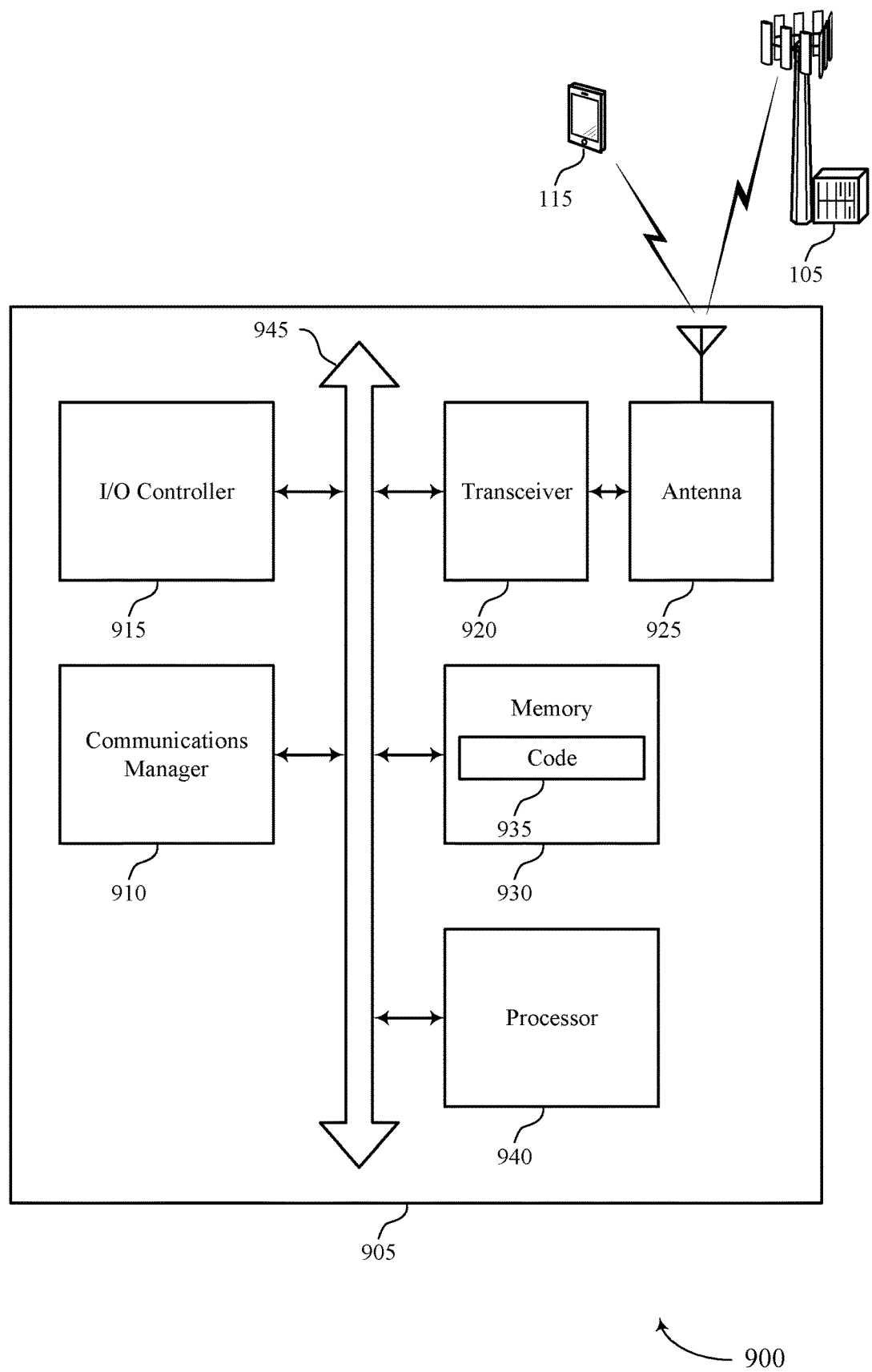
FIG. 9 shows a diagram of a system including a device that supports hierarchical HARQ for multi-level coding with multi-level sequential demodulation and decoding and code block grouping per decoding level in accordance with aspects of the present disclosure.

FIG. 9 shows a diagram of a system 900 including a device 905 that supports hierarchical HARQ for multi-level coding with multi-level sequential demodulation and decoding and code block grouping per decoding level in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station in a first time period and on a same set of channel resources, a multi-level coded and modulated signal including at least a first CBG and a second CBG corresponding to the first CBG, the first CBG including a first set of codeblocks and the second CBG including a second set of codeblocks, each codeblock of the first set of codeblocks associated with a first decoding level of the multi-level coded and modulated transmission and each codeblock of the second set of codeblocks associated with a second decoding level of the multi-level coded transmission, where the first decoding level is lower than the second decoding level, and the first decoding level is to be decoded prior to decoding of the second decoding level and determine that a decoding procedure associated with the first CBG is unsuccessful.

The communications manager 910 may store post processing samples for the multi-level coded and modulated signal, transmit, to the base station, a feedback message including an indication that the decoding procedure was unsuccessful for the first CBG and the second CBG, receive, from the base station in a second one or more time periods and in response to the transmitted feedback message, one or more retransmissions of the first CBG, successfully decode the first CBG based on the first CBG from the first time period and the one or more retransmissions of the first CBG from the second one or more time periods, and attempt to decode the second CBG from the first time period using the stored post processing samples and based on the successful decoding of the corresponding first CBG.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting hierarchical HARQ for multi-level coding with multi-level sequential demodulation and decoding and code block grouping per decoding level).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
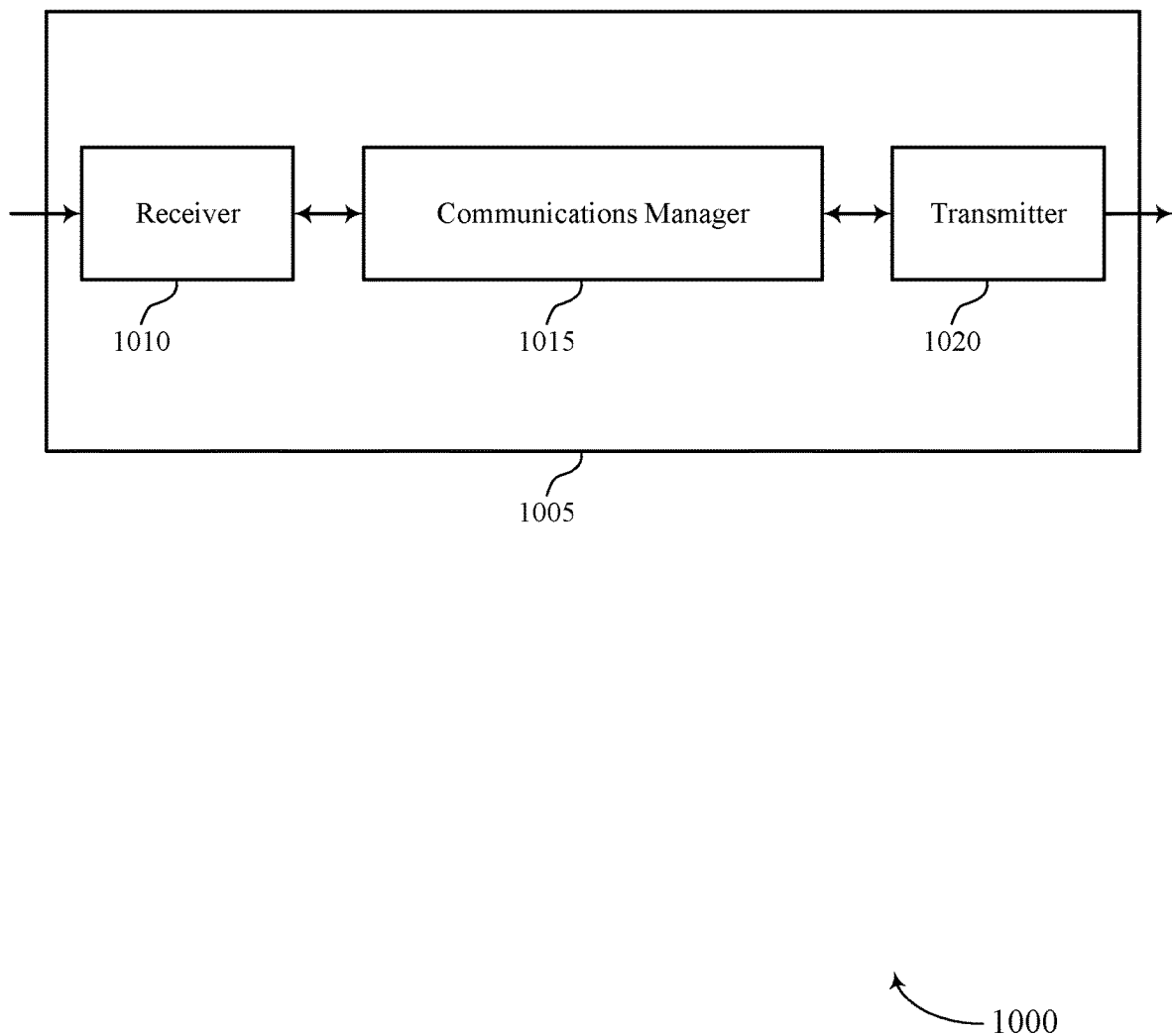
FIGS. 10 and 11 show block diagrams of devices that support hierarchical HARQ for multi-level coding with multi-level sequential demodulation and decoding and code block grouping per decoding level in accordance with aspects of the present disclosure.

FIG. 10 shows a block diagram 1000 of a device 1005 that supports hierarchical HARQ for multi-level coding with multi-level sequential demodulation and decoding and code block grouping per decoding level in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to hierarchical HARQ for multi-level coding with multi-level sequential demodulation and decoding and code block grouping per decoding level, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may encode, according to a multi-level coding and modulation procedure, at least a first CBG including a first set of codeblocks and a second CBG corresponding to the first CBG and including a second set of codeblocks, each codeblock of the first set of codeblocks associated with a first decoding level of the multi-level coding and modulation procedure, and each codeblock of the second set of codeblocks associated with a second decoding level of the multi-level coding and modulation procedure, the first decoding level lower than the second decoding level, and the first decoding level to be decoded prior to decoding of the second decoding level, transmit, to a UE in a first time period and on a same set of channel resources, a multi-level coded and modulated signal including the encoded first CBG and the encoded second CBG, receive, from the UE, a feedback message including an indication that a decoding procedure was unsuccessful for the first CBG and the second CBG, encode, according to the multi-level coding and modulation procedure, a retransmission of the first CBG and a new set of codeblocks for the corresponding second CBG associated with the second decoding level, and transmit, to the UE in a second time period in response to receiving the feedback message, the retransmission of the first CBG and the new set of codeblocks for the second CBG. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
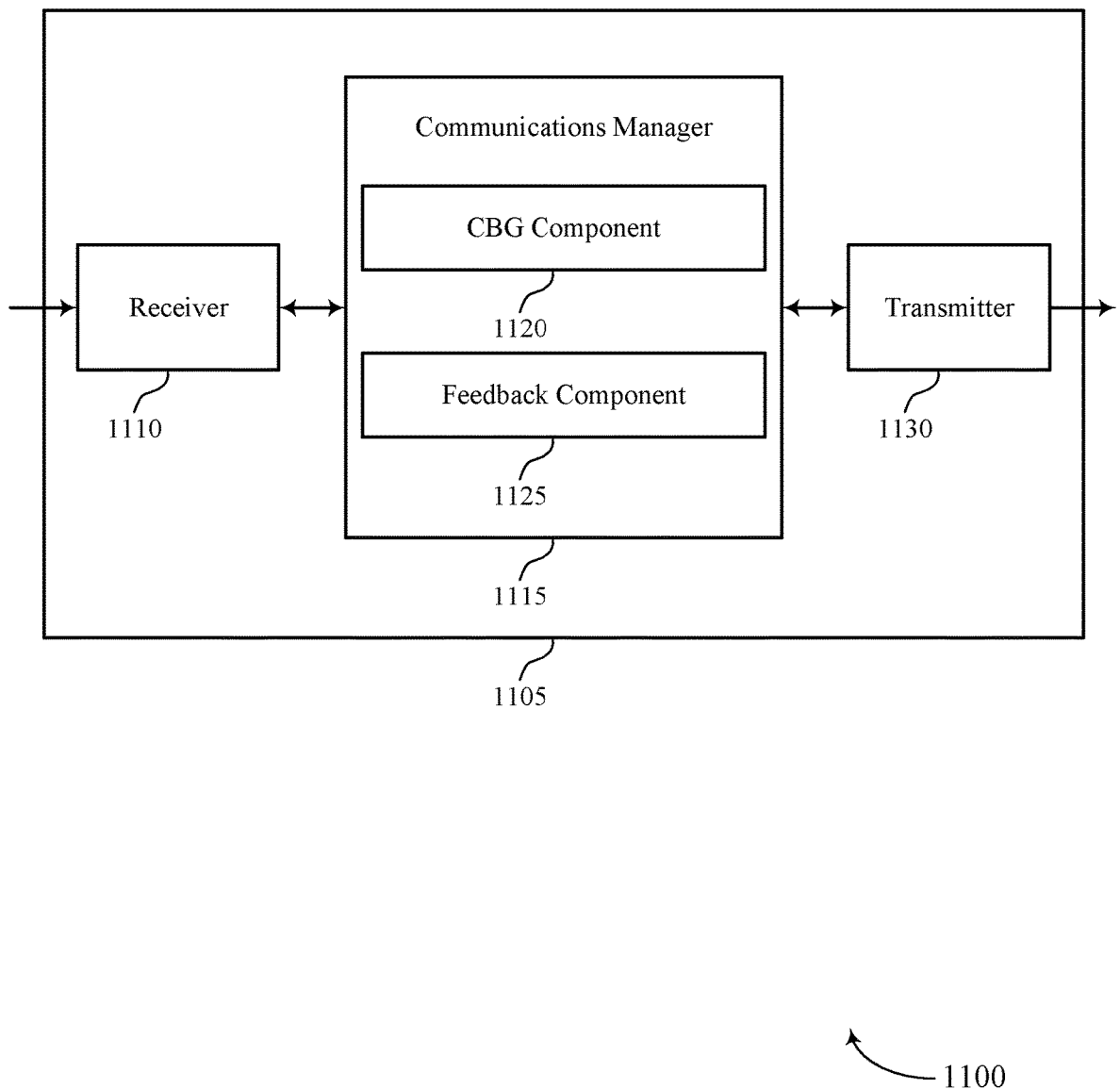

FIG. 11 shows a block diagram 1100 of a device 1105 that supports hierarchical HARQ for multi-level coding with multi-level sequential demodulation and decoding and code block grouping per decoding level in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to hierarchical HARQ for multi-level coding with multi-level sequential demodulation and decoding and code block grouping per decoding level, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a CBG component 1120 and a feedback component 1125. The communications manager 1115 may be an example of aspects of the communications manager 1310 described herein.

The CBG component 1120 may encode, according to a multi-level coding and modulation procedure, at least a first CBG including a first set of codeblocks and a second CBG corresponding to the first CBG and including a second set of codeblocks, each codeblock of the first set of codeblocks associated with a first decoding level of the multi-level coding and modulation procedure, and each codeblock of the second set of codeblocks associated with a second decoding level of the multi-level coding and modulation procedure, the first decoding level lower than the second decoding level, and the first decoding level to be decoded prior to decoding of the second decoding level and transmit, to a UE in a first time period and on a same set of channel resources, a multi-level coded and modulated signal including the encoded first CBG and the encoded second CBG.

The feedback component 1125 may receive, from the UE, a feedback message including an indication that a decoding procedure was unsuccessful for the first CBG and the second CBG. The CBG component 1120 may encode, according to the multi-level coding and modulation procedure, a retransmission of the first CBG and a new set of codeblocks for the corresponding second CBG associated with the second decoding level and transmit, to the UE in a second time period in response to receiving the feedback message, the retransmission of the first CBG and the new set of codeblocks for the second CBG.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
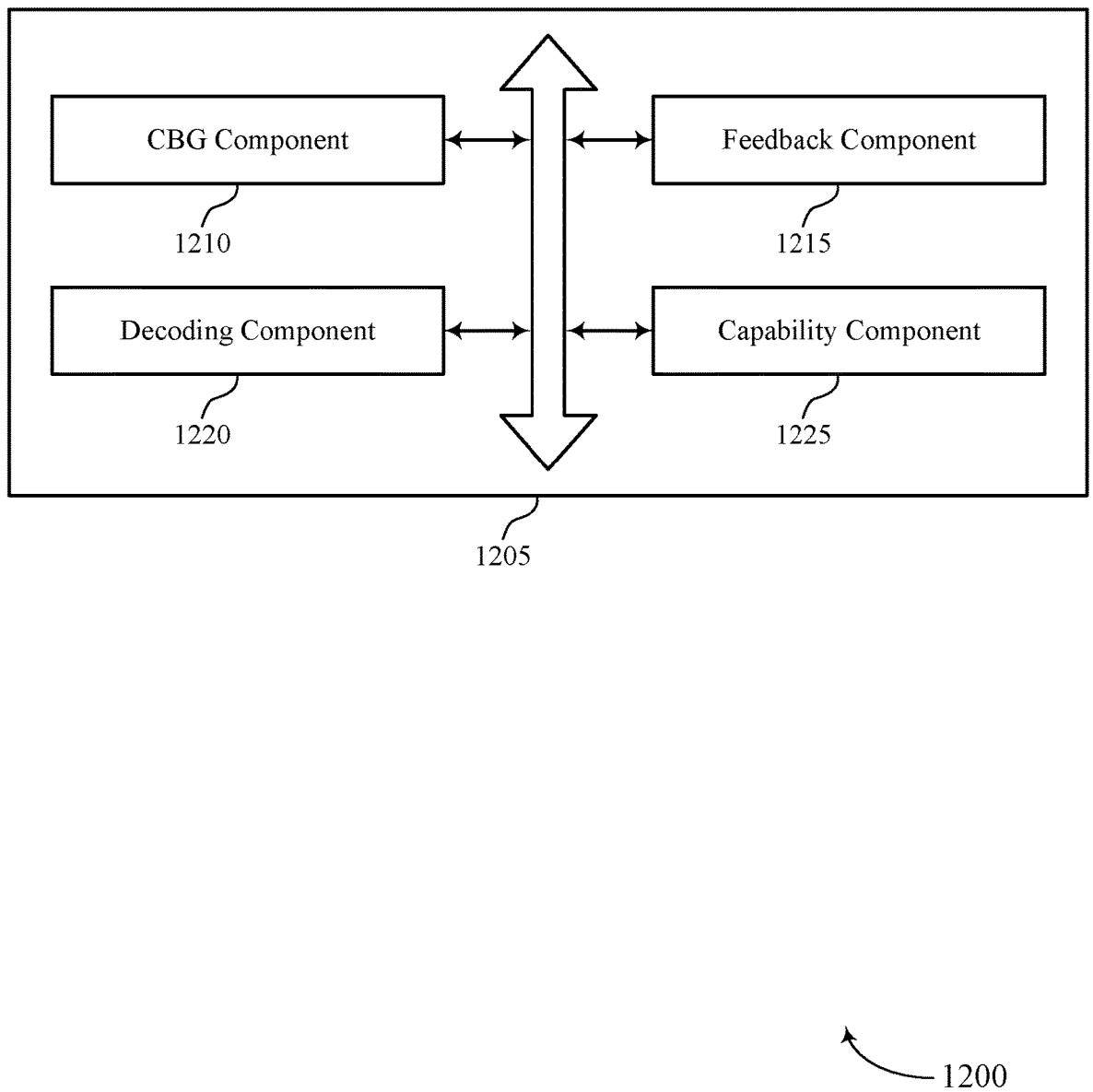
FIG. 12 shows a block diagram of a communications manager that supports hierarchical HARQ for multi-level coding with multi-level sequential demodulation and decoding and code block grouping per decoding level in accordance with aspects of the present disclosure.

FIG. 12 shows a block diagram 1200 of a communications manager 1205 that supports hierarchical HARQ for multi-level coding with multi-level sequential demodulation and decoding and code block grouping per decoding level in accordance with aspects of the present disclosure. The communications manager 1205 may be an example of aspects of a communications manager 1015, a communications manager 1115, or a communications manager 1310 described herein. The communications manager 1205 may include a CBG component 1210, a feedback component 1215, a decoding component 1220, and a capability component 1225. Each of these modules may communicate, directly or indirectly, with one another (e.g., via one or more buses).

The CBG component 1210 may encode, according to a multi-level coding and modulation procedure, at least a first CBG including a first set of codeblocks and a second CBG corresponding to the first CBG and including a second set of codeblocks, each codeblock of the first set of codeblocks associated with a first decoding level of the multi-level coding and modulation procedure, and each codeblock of the second set of codeblocks associated with a second decoding level of the multi-level coding and modulation procedure, the first decoding level lower than the second decoding level, and the first decoding level to be decoded prior to decoding of the second decoding level. In some examples, the CBG component 1210 may transmit, to a UE in a first time period and on a same set of channel resources, a multi-level coded and modulated signal including the encoded first CBG and the encoded second CBG.

The feedback component 1215 may receive, from the UE, a feedback message including an indication that a decoding procedure was unsuccessful for the first CBG and the second CBG. In some examples, the CBG component 1210 may encode, according to the multi-level coding and modulation procedure, a retransmission of the first CBG and a new set of codeblocks for the corresponding second CBG associated with the second decoding level. In some examples, the CBG component 1210 may transmit, to the UE in a second time period in response to receiving the feedback message, the retransmission of the first CBG and the new set of codeblocks for the second CBG.

In some examples, the CBG component 1210 may transmit, to the UE in a third time period, a transmission of a new set of codeblocks for the first CBG associated with the first decoding level. In some examples, the CBG component 1210 may transmit, to the UE in the third time period, a retransmission of the second CBG from the first time period.

In some examples, the feedback component 1215 may receive, from the UE, a second feedback message including an indication that the decoding procedure was unsuccessful for the second CBG from the first time period and was successful for the first CBG from the first time period after retransmission. In some examples, the feedback component 1215 may receive, from the UE, a third feedback message including an indication that the decoding procedure was successful for the new set of codeblocks for the second CBG. In some examples, the feedback component 1215 may receive, from the UE, a third feedback message including an indication that the decoding procedure was successful for the second CBG from the first time period and for the new set of blocks for the first CBG from the third time period. In some examples, the feedback component 1215 may receive a NACK message for the first CBG and the second CBG.

The decoding component 1220 may determine the first decoding level has shorter or same length codeblocks compared to the second decoding level. The decoding component 1220 may determine the first decoding level has longer codeblocks than the second decoding level.

The capability component 1225 may receive, from the UE, an indication of a capability of the UE to support hierarchical acknowledgment feedback and a number of HARQ processes across a set of decoding levels, where transmitting the retransmission of the first CBG transmitted with a new set of codeblocks for the corresponding second code block group is based on the transmitted indication. In some examples, the capability component 1225 may receive, from the UE, an indication of a capability of the UE to support a maximum number of hierarchical HARQ buffers associated with the number of hierarchical HARQ processes.

Figure 13:
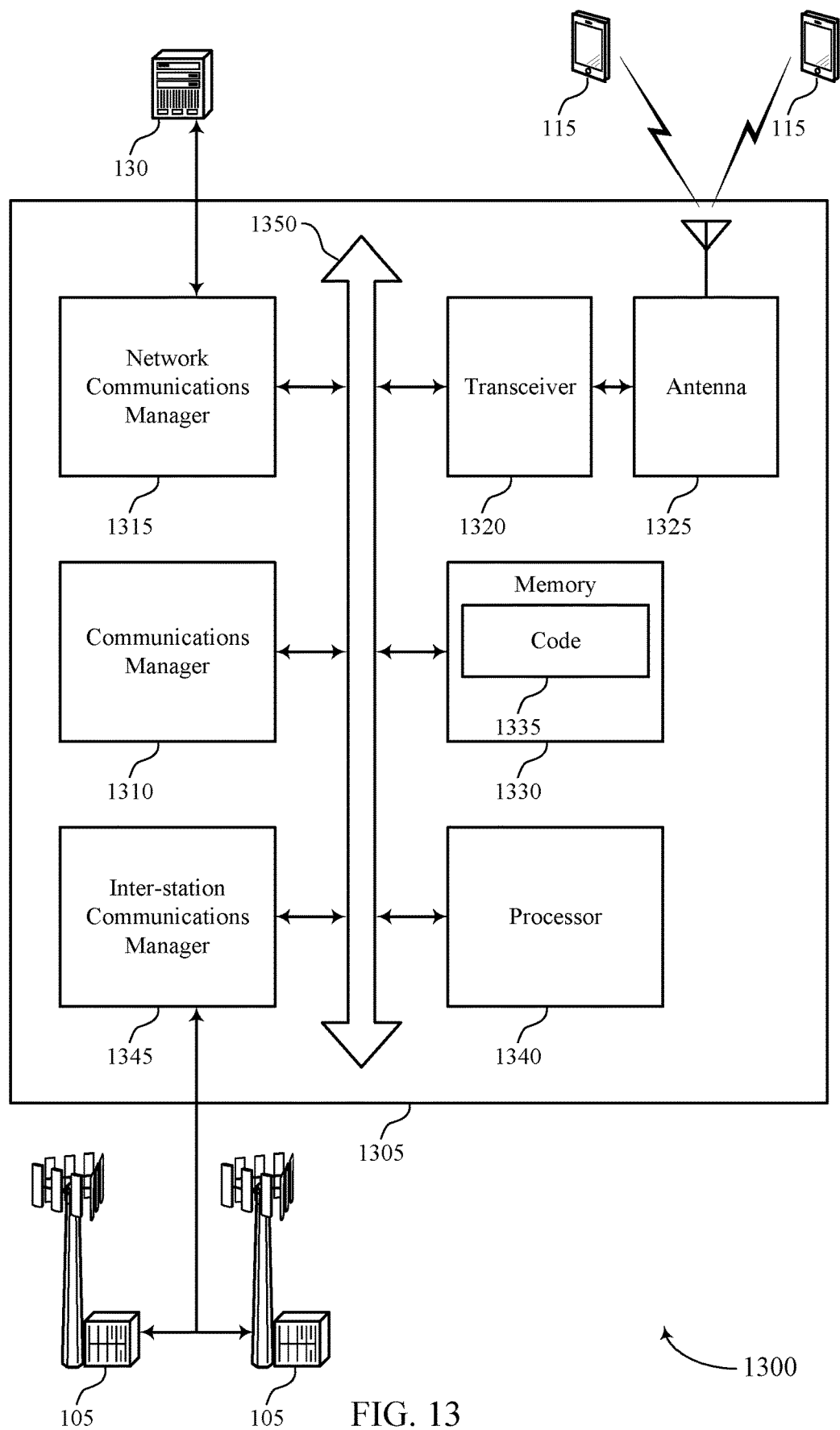
FIG. 13 shows a diagram of a system including a device that supports hierarchical HARQ for multi-level coding with multi-level sequential demodulation and decoding and code block grouping per decoding level in accordance with aspects of the present disclosure.

FIG. 13 shows a diagram of a system 1300 including a device 1305 that supports hierarchical HARQ for multi-level coding with multi-level sequential demodulation and decoding and code block grouping per decoding level in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may encode, according to a multi-level coding and modulation procedure, at least a first CBG including a first set of codeblocks and a second CBG corresponding to the first CBG and including a second set of codeblocks, each codeblock of the first set of codeblocks associated with a first decoding level of the multi-level coding and modulation procedure, and each codeblock of the second set of codeblocks associated with a second decoding level of the multi-level coding and modulation procedure, the first decoding level lower than the second decoding level, and the first decoding level to be decoded prior to decoding of the second decoding level, transmit, to a UE in a first time period and on a same set of channel resources, a multi-level coded and modulated signal including the encoded first CBG and the encoded second CBG, receive, from the UE, a feedback message including an indication that a decoding procedure was unsuccessful for the first CBG and the second CBG, encode, according to the multi-level coding and modulation procedure, a retransmission of the first CBG and a new set of codeblocks for the corresponding second CBG associated with the second decoding level, and transmit, to the UE in a second time period in response to receiving the feedback message, the retransmission of the first CBG and the new set of codeblocks for the second CBG.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting hierarchical HARQ for multi-level coding with multi-level sequential demodulation and decoding and code block grouping per decoding level).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
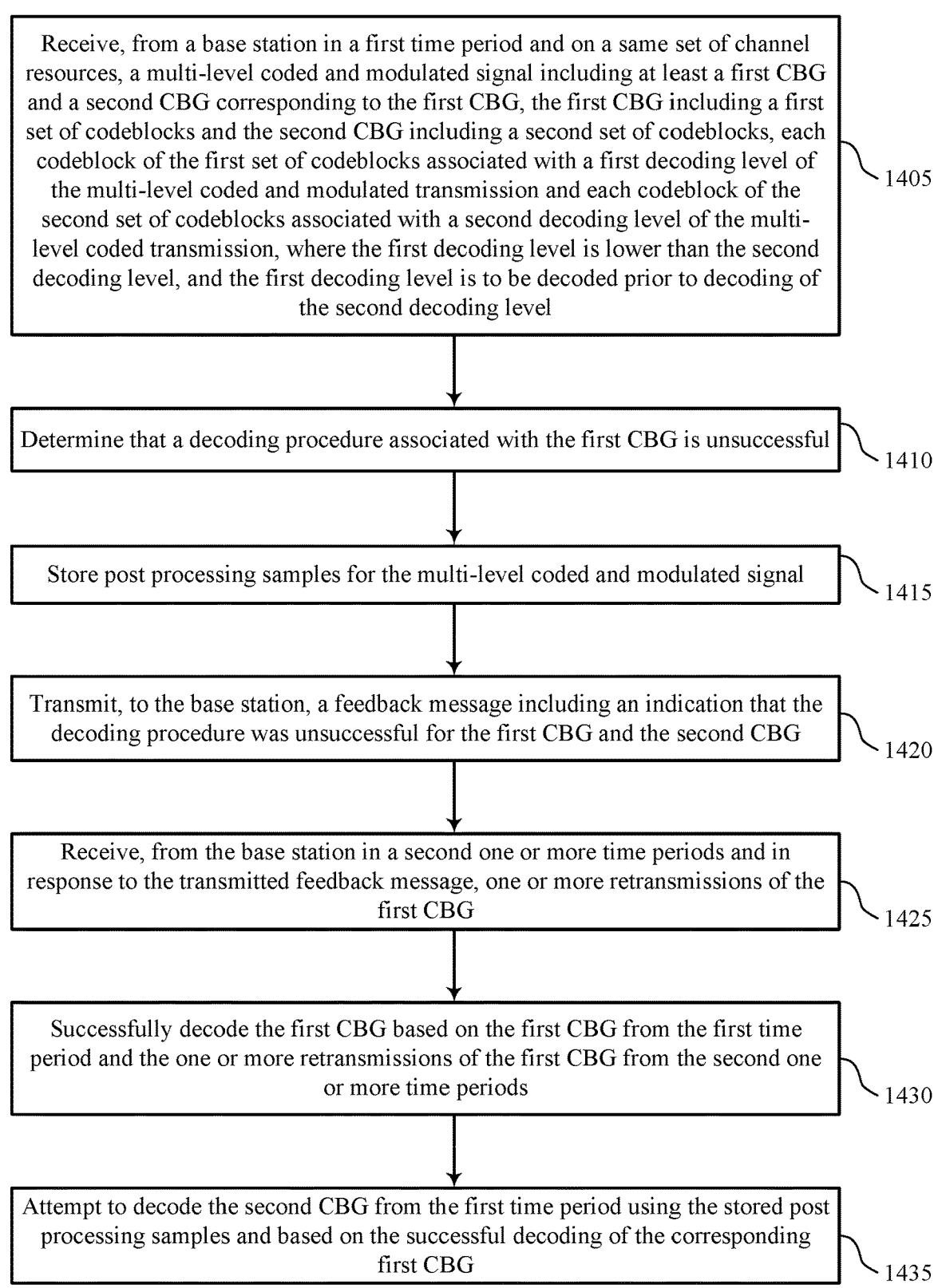
FIGS. 14 through 17 show flowcharts illustrating methods that support hierarchical HARQ for multi-level coding with multi-level sequential demodulation and decoding and code block grouping per decoding level in accordance with aspects of the present disclosure.

FIG. 14 shows a flowchart illustrating a method 1400 that supports hierarchical HARQ for multi-level coding with multi-level sequential demodulation and decoding and code block grouping per decoding level in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station in a first time period and on a same set of channel resources, a multi-level coded and modulated signal including at least a first CBG and a second CBG corresponding to the first CBG, the first CBG including a first set of codeblocks and the second CBG including a second set of codeblocks, each codeblock of the first set of codeblocks associated with a first decoding level of the multi-level coded and modulated transmission and each codeblock of the second set of codeblocks associated with a second decoding level of the multi-level coded transmission, where the first decoding level is lower than the second decoding level, and the first decoding level is to be decoded prior to decoding of the second decoding level. The operations of 1405 may be performed according to the methods described herein. In some examples, aspects of the operations of 1405 may be performed by a CBG component as described with reference to FIGS. 6 through 9.

At 1410, the UE may determine that a decoding procedure associated with the first CBG is unsuccessful. The operations of 1410 may be performed according to the methods described herein. In some examples, aspects of the operations of 1410 may be performed by a CBG component as described with reference to FIGS. 6 through 9.

At 1415, the UE may store post processing samples for the multi-level coded and modulated signal. The operations of 1415 may be performed according to the methods described herein. In some examples, aspects of the operations of 1415 may be performed by a samples component as described with reference to FIGS. 6 through 9.

At 1420, the UE may transmit, to the base station, a feedback message including an indication that the decoding procedure was unsuccessful for the first CBG and the second CBG. The operations of 1420 may be performed according to the methods described herein. In some examples, aspects of the operations of 1420 may be performed by a feedback component as described with reference to FIGS. 6 through 9.

At 1425, the UE may receive, from the base station in a second one or more time periods and in response to the transmitted feedback message, one or more retransmissions of the first CBG. The operations of 1425 may be performed according to the methods described herein. In some examples, aspects of the operations of 1425 may be performed by a CBG component as described with reference to FIGS. 6 through 9.

At 1430, the UE may successfully decode the first CBG based on the first CBG from the first time period and the one or more retransmissions of the first CBG from the second one or more time periods. The operations of 1430 may be performed according to the methods described herein. In some examples, aspects of the operations of 1430 may be performed by a CBG component as described with reference to FIGS. 6 through 9.

At 1435, the UE may attempt to decode the second CBG from the first time period using the stored post processing samples and based on the successful decoding of the corresponding first CBG. The operations of 1435 may be performed according to the methods described herein. In some examples, aspects of the operations of 1435 may be performed by a samples component as described with reference to FIGS. 6 through 9.

Figure 15:
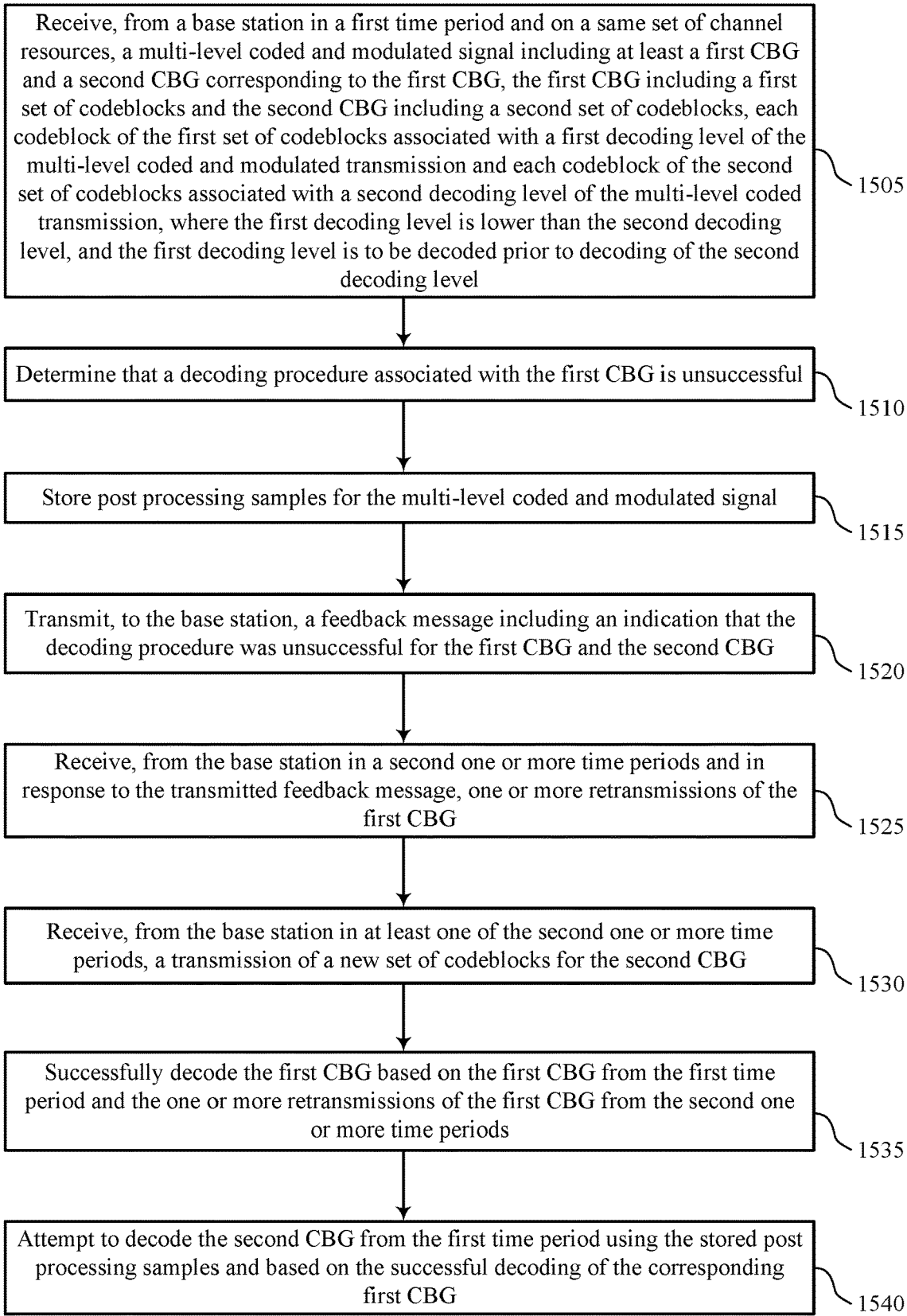

FIG. 15 shows a flowchart illustrating a method 1500 that supports hierarchical HARQ for multi-level coding with multi-level sequential demodulation and decoding and code block grouping per decoding level in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station in a first time period and on a same set of channel resources, a multi-level coded and modulated signal including at least a first CBG and a second CBG corresponding to the first CBG, the first CBG including a first set of codeblocks and the second CBG including a second set of codeblocks, each codeblock of the first set of codeblocks associated with a first decoding level of the multi-level coded and modulated transmission and each codeblock of the second set of codeblocks associated with a second decoding level of the multi-level coded transmission, where the first decoding level is lower than the second decoding level, and the first decoding level is to be decoded prior to decoding of the second decoding level. The operations of 1505 may be performed according to the methods described herein. In some examples, aspects of the operations of 1505 may be performed by a CBG component as described with reference to FIGS. 6 through 9.

At 1510, the UE may determine that a decoding procedure associated with the first CBG is unsuccessful. The operations of 1510 may be performed according to the methods described herein. In some examples, aspects of the operations of 1510 may be performed by a CBG component as described with reference to FIGS. 6 through 9.

At 1515, the UE may store post processing samples for the multi-level coded and modulated signal. The operations of 1515 may be performed according to the methods described herein. In some examples, aspects of the operations of 1515 may be performed by a samples component as described with reference to FIGS. 6 through 9.

At 1520, the UE may transmit, to the base station, a feedback message including an indication that the decoding procedure was unsuccessful for the first CBG and the second CBG. The operations of 1520 may be performed according to the methods described herein. In some examples, aspects of the operations of 1520 may be performed by a feedback component as described with reference to FIGS. 6 through 9.

At 1525, the UE may receive, from the base station in a second one or more time periods and in response to the transmitted feedback message, one or more retransmissions of the first CBG. The operations of 1525 may be performed according to the methods described herein. In some examples, aspects of the operations of 1525 may be performed by a CBG component as described with reference to FIGS. 6 through 9.

At 1530, the UE may receive, from the base station in at least one of the second one or more time periods, a transmission of a new set of codeblocks for the second CBG. The operations of 1530 may be performed according to the methods described herein. In some examples, aspects of the operations of 1530 may be performed by a CBG component as described with reference to FIGS. 6 through 9.

At 1535, the UE may successfully decode the first CBG based on the first CBG from the first time period and the one or more retransmissions of the first CBG from the second one or more time periods. The operations of 1535 may be performed according to the methods described herein. In some examples, aspects of the operations of 1535 may be performed by a CBG component as described with reference to FIGS. 6 through 9.

At 1540, the UE may attempt to decode the second CBG from the first time period using the stored post processing samples and based on the successful decoding of the corresponding first CBG. The operations of 1540 may be performed according to the methods described herein. In some examples, aspects of the operations of 1540 may be performed by a samples component as described with reference to FIGS. 6 through 9.

Figure 16:
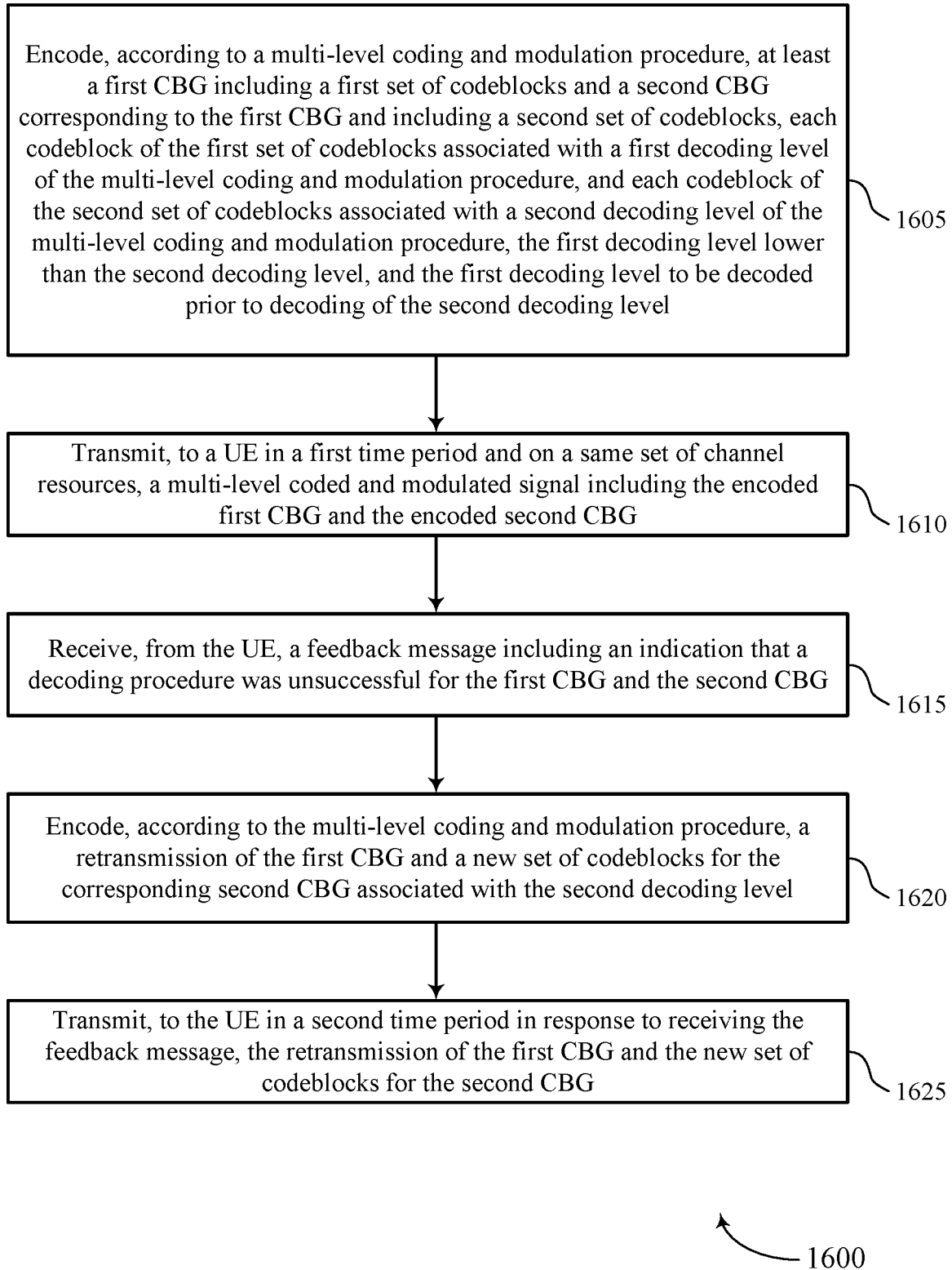

FIG. 16 shows a flowchart illustrating a method 1600 that supports hierarchical HARQ for multi-level coding with multi-level sequential demodulation and decoding and code block grouping per decoding level in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may encode, according to a multi-level coding and modulation procedure, at least a first CBG including a first set of codeblocks and a second CBG corresponding to the first CBG and including a second set of codeblocks, each codeblock of the first set of codeblocks associated with a first decoding level of the multi-level coding and modulation procedure, and each codeblock of the second set of codeblocks associated with a second decoding level of the multi-level coding and modulation procedure, the first decoding level lower than the second decoding level, and the first decoding level to be decoded prior to decoding of the second decoding level. The operations of 1605 may be performed according to the methods described herein. In some examples, aspects of the operations of 1605 may be performed by a CBG component as described with reference to FIGS. 10 through 13.

At 1610, the base station may transmit, to a UE in a first time period and on a same set of channel resources, a multi-level coded and modulated signal including the encoded first CBG and the encoded second CBG. The operations of 1610 may be performed according to the methods described herein. In some examples, aspects of the operations of 1610 may be performed by a CBG component as described with reference to FIGS. 10 through 13.

At 1615, the base station may receive, from the UE, a feedback message including an indication that a decoding procedure was unsuccessful for the first CBG and the second CBG. The operations of 1615 may be performed according to the methods described herein. In some examples, aspects of the operations of 1615 may be performed by a feedback component as described with reference to FIGS. 10 through 13.

At 1620, the base station may encode, according to the multi-level coding and modulation procedure, a retransmission of the first CBG and a new set of codeblocks for the corresponding second CBG associated with the second decoding level. The operations of 1620 may be performed according to the methods described herein. In some examples, aspects of the operations of 1620 may be performed by a CBG component as described with reference to FIGS. 10 through 13.

At 1625, the base station may transmit, to the UE in a second time period in response to receiving the feedback message, the retransmission of the first CBG and the new set of codeblocks for the second CBG. The operations of 1625 may be performed according to the methods described herein. In some examples, aspects of the operations of 1625 may be performed by a CBG component as described with reference to FIGS. 10 through 13.

Figure 17:
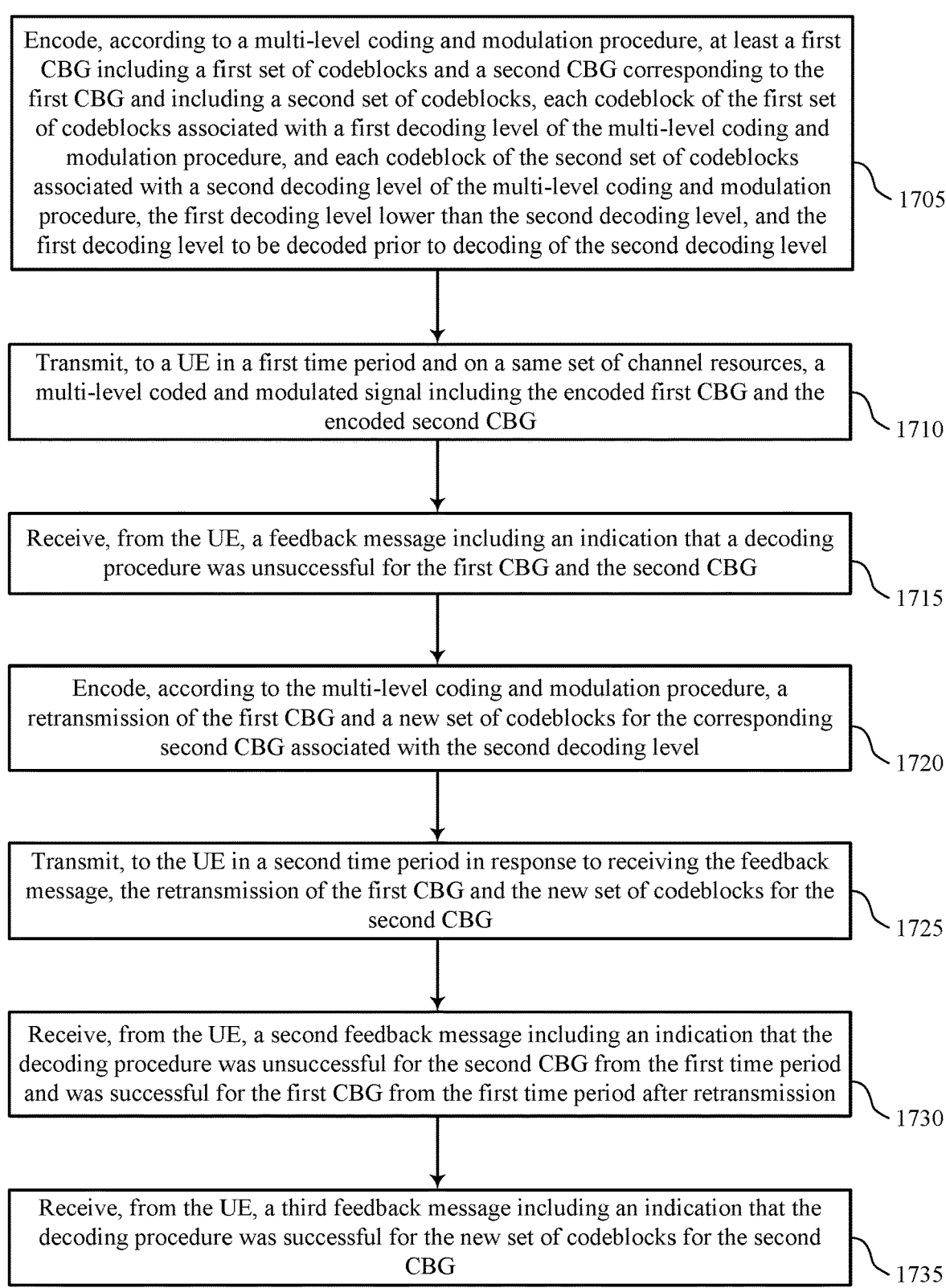

FIG. 17 shows a flowchart illustrating a method 1700 that supports hierarchical HARQ for multi-level coding with multi-level sequential demodulation and decoding and code block grouping per decoding level in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may encode, according to a multi-level coding and modulation procedure, at least a first CBG including a first set of codeblocks and a second CBG corresponding to the first CBG and including a second set of codeblocks, each codeblock of the first set of codeblocks associated with a first decoding level of the multi-level coding and modulation procedure, and each codeblock of the second set of codeblocks associated with a second decoding level of the multi-level coding and modulation procedure, the first decoding level lower than the second decoding level, and the first decoding level to be decoded prior to decoding of the second decoding level. The operations of 1705 may be performed according to the methods described herein. In some examples, aspects of the operations of 1705 may be performed by a CBG component as described with reference to FIGS. 10 through 13.

At 1710, the base station may transmit, to a UE in a first time period and on a same set of channel resources, a multi-level coded and modulated signal including the encoded first CBG and the encoded second CBG. The operations of 1710 may be performed according to the methods described herein. In some examples, aspects of the operations of 1710 may be performed by a CBG component as described with reference to FIGS. 10 through 13.

At 1715, the base station may receive, from the UE, a feedback message including an indication that a decoding procedure was unsuccessful for the first CBG and the second CBG. The operations of 1715 may be performed according to the methods described herein. In some examples, aspects of the operations of 1715 may be performed by a feedback component as described with reference to FIGS. 10 through 13.

At 1720, the base station may encode and modulate, according to the multi-level coding and modulation procedure, a retransmission of the first CBG and a new set of codeblocks for the corresponding second CBG associated with the second decoding level. The operations of 1720 may be performed according to the methods described herein. In some examples, aspects of the operations of 1720 may be performed by a CBG component as described with reference to FIGS. 10 through 13.

At 1725, the base station may transmit, to the UE in a second time period in response to receiving the feedback message, the retransmission of the first CBG and the new set of codeblocks for the second CBG. The operations of 1725 may be performed according to the methods described herein. In some examples, aspects of the operations of 1725 may be performed by a CBG component as described with reference to FIGS. 10 through 13.

At 1730, the base station may receive, from the UE, a second feedback message including an indication that the decoding procedure was unsuccessful for the second CBG from the first time period and was successful for the first CBG from the first time period after retransmission. The operations of 1730 may be performed according to the methods described herein. In some examples, aspects of the operations of 1730 may be performed by a feedback component as described with reference to FIGS. 10 through 13.

At 1735, the base station may receive, from the UE, a third feedback message including an indication that the decoding procedure was successful for the new set of codeblocks for the second CBG. The operations of 1735 may be performed according to the methods described herein. In some examples, aspects of the operations of 1735 may be performed by a feedback component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Example 1: A method for wireless communications at a user equipment (UE), comprising: receiving, from a base station in a first time period and on a same set of channel resources, a multi-level coded and modulated signal comprising at least a first codeblock group and a second codeblock group corresponding to the first codeblock group, the first codeblock group comprising a first plurality of codeblocks and the second codeblock group comprising a second plurality of codeblocks, each codeblock of the first plurality of codeblocks associated with a first decoding level of the multi-level coded and modulated transmission and each codeblock of the second plurality of codeblocks associated with a second decoding level of the multi-level coded transmission, wherein the first decoding level is lower than the second decoding level, and the first decoding level is to be decoded prior to decoding of the second decoding level; determining that a decoding procedure associated with the first codeblock group is unsuccessful; storing post processing samples for the multi-level coded and modulated signal; transmitting, to the base station, a feedback message comprising an indication that the decoding procedure was unsuccessful for the first codeblock group and the second codeblock group; receiving, from the base station in a second one or more time periods and in response to the transmitted feedback message, one or more retransmissions of the first codeblock group; successfully decoding the first codeblock group based at least in part on the first codeblock group from the first time period and the one or more retransmissions of the first codeblock group from the second one or more time periods; and attempting to decode the second codeblock group from the first time period using the stored post processing samples and based at least in part on the successful decoding of the corresponding first codeblock group.

Example 2: The method of example 1, further comprising: receiving, from the base station in at least one of the second one or more time periods, a transmission of a new set of codeblocks for the second codeblock group.

Example 3: The method of examples 1 or 2, wherein attempting to decode the second codeblock group using the stored post processing samples further comprises: regenerating a corresponding redundancy version for the first plurality of codeblocks from the first code block group and associated with the first decoding level from the first transmission period; determining partitioning information based at least in part on the successful decoding the first codeblock group and the regenerated redundancy version; and attempting to decode the second codeblock group from the first time period based at least in part on the partitioning information.

Example 4: The method of any of examples 1 to 3, further comprising: transmitting, to the base station in response to successfully decoding the first codeblock group based at least in part on the one or more retransmissions of the first codeblock group, a second feedback message comprising an indication that the decoding procedure was successful for the first codeblock group.

Example 5: The method of any of examples 1 to 4, further comprising: transmitting, to the base station, a second feedback message comprising an indication that the decoding procedure was unsuccessful for the second codeblock group transmitted in the first time period.

Example 6: The method of any of examples 1 to 5, further comprising: receiving, from the base station in a third time period, a transmission of a new set of data for the first codeblock group; receiving, from the base station in the third time period, a retransmission of the second codeblock group; and attempting to decode the retransmission of the second codeblock group based at least in part on the successful decoding of the new data for the first codeblock group and based on log likelihood ratios (LLRs) combining for the first transmission of the second codeblock group and the retransmission of the second codeblock group.

Example 7: The method of any of examples 1 to 6, further comprising: transmitting, to the base station, a third feedback message comprising an indication that the decoding procedure was successful for the first codeblock group from the third time period; and transmitting, to the base station, a fourth feedback message comprising an indication that the decoding procedure was successful for the second codeblock group from the first time period based at least in part on the stored post processing samples and log likelihood ratios (LLRs) combining of the second codeblock group transmitted in the first time period and the retransmission of the second codeblock group in the third time period.

Example 8: The method of any of examples 1 to 7, wherein transmitting the feedback message further comprises: transmitting a negative acknowledgement message for the first codeblock group and the second codeblock group.

Example 9: The method of any of examples 1 to 8, wherein the first decoding level has shorter or same length codeblocks compared to the second decoding level.

Example 10: The method of any of examples 1 to 8, wherein the first decoding level has longer codeblocks than the second decoding level.

Example 11: The method of any of examples 1 to 10, further comprising: transmitting, to the base station, an indication of a capability of the UE to support hierarchical acknowledgment feedback and a number of hybrid automatic repeat request processes across a plurality of decoding levels, wherein receiving the retransmission of the first codeblock group transmitted with a new data transmission for the corresponding second code block group is based at least in part on the transmitted indication.

Example 12: A method for wireless communications at a base station, comprising: encoding, according to a multi-level coding and modulation procedure, at least a first codeblock group comprising a first plurality of codeblocks and a second codeblock group corresponding to the first codeblock group and comprising a second plurality of codeblocks, each codeblock of the first plurality of codeblocks associated with a first decoding level of the multi-level coding and modulation procedure, and each codeblock of the second plurality of codeblocks associated with a second decoding level of the multi-level coding and modulation procedure, the first decoding level lower than the second decoding level, and the first decoding level to be decoded prior to decoding of the second decoding level; transmitting, to a user equipment (UE) in a first time period and on a same set of channel resources, a multi-level coded and modulated signal comprising the encoded first codeblock group and the encoded second codeblock group; receiving, from the UE, a feedback message comprising an indication that a decoding procedure was unsuccessful for the first codeblock group and the second codeblock group; encoding, according to the multi-level coding and modulation procedure, a retransmission of the first codeblock group and a new set of codeblocks for the corresponding second codeblock group associated with the second decoding level; and transmitting, to the UE in a second time period in response to receiving the feedback message, the retransmission of the first codeblock group and the new set of codeblocks for the second codeblock group.

Example 13: The method of example 12, further comprising: receiving, from the UE, a second feedback message comprising an indication that the decoding procedure was unsuccessful for the second codeblock group from the first time period and was successful for the first codeblock group from the first time period after retransmission; and receiving, from the UE, a third feedback message comprising an indication that the decoding procedure was successful for the new set of codeblocks for the second codeblock group.

Example 14: The method of examples 12 or 13, further comprising: transmitting, to the UE in a third time period, a transmission of a new set of codeblocks for the first codeblock group associated with the first decoding level; and transmitting, to the UE in the third time period, a retransmission of the second codeblock group from the first time period.

Example 15: The method of any of examples 12 to 14, further comprising: receiving, from the UE, a fourth feedback message comprising an indication that the decoding procedure was successful for the second codeblock group from the first time period and for the new set of blocks for the first codeblock group from the third time period.

Example 16: The method of any of examples 12 to 15, wherein receiving the feedback message further comprises: receiving a negative acknowledgement message for the first codeblock group and the second codeblock group.

Example 17: The method of any of examples 12 to 16, wherein the first decoding level has shorter or same length codeblocks compared to the second decoding level.

Example 18: The method of any of examples 12 to 17, wherein the first decoding level has longer codeblocks than the second decoding level.

Example 19: The method of any of examples 12 to 18, further comprising: receiving, from the UE, an indication of a capability of the UE to support hierarchical acknowledgment feedback and a number of hybrid automatic repeat request processes across a plurality of decoding levels, wherein transmitting the retransmission of the first codeblock group transmitted with a new set of codeblocks for the corresponding second code block group is based at least in part on the transmitted indication.

Example 20: The method of any of examples 12 to 19, further comprising: receiving, from the UE, an indication of a capability of the UE to support a maximum number of hierarchical hybrid automatic repeat request buffers associated with the number of hybrid automatic repeat request processes.

Example 21: An apparatus for wireless communications comprising a processor; memory coupled with the processor; and instructions stored in the memory and executable by the processor to cause the apparatus to perform a method of any of examples 1 to 11.

Example 22: An apparatus for wireless communications comprising a processor; and memory coupled to the processor, the processor and memory configured to perform a method of any of examples 12 to 20.

Example 23: An apparatus comprising at least one means for performing a method of any of examples 1 to 11.

Example 24: An apparatus comprising at least one means for performing a method of any of examples 12 to 20.

Example 25: A non-transitory computer-readable medium storing code for wireless communications, the code comprising instructions executable by a processor to perform a method of any of examples 1 to 11.

Example 26: A non-transitory computer-readable medium storing code for wireless communications, the code comprising instructions executable by a processor to perform a method of any of examples 12 to 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, in a first time period and on a same set of channel resources, a signal encoded with a plurality of decoding levels, the signal comprising at least a first codeblock group and a second codeblock group corresponding to the first codeblock group, the first codeblock group comprising a first plurality of codeblocks and the second codeblock group comprising a second plurality of codeblocks, each codeblock of the first plurality of codeblocks associated with a first decoding level of the plurality of decoding levels and each codeblock of the second plurality of codeblocks associated with a second decoding level of the plurality of decoding levels, wherein the first decoding level is lower than the second decoding level, and the first decoding level is to be decoded prior to decoding of the second decoding level;
   determining that a decoding procedure associated with at least one codeblock of the first codeblock group is unsuccessful;
   storing post processing samples for the signal, wherein the post processing samples comprise frequency domain samples for resource elements of the at least one codeblock of the first codeblock group;
   transmitting a feedback message comprising an indication that the decoding procedure was unsuccessful for the first codeblock group and the second codeblock group;
   receiving, in a second one or more time periods and in response to the transmitted feedback message, one or more retransmissions of the first codeblock group;
   successfully decoding the first codeblock group based at least in part on the first codeblock group from the first time period and the one or more retransmissions of the first codeblock group from the second one or more time periods; and
   attempting to decode the second codeblock group from the first time period using the stored post processing samples and based at least in part on the successful decoding of the corresponding first codeblock group.

2. The method of claim 1, further comprising:
   receiving, in at least one of the second one or more time periods, a transmission of a new set of codeblocks for the second codeblock group.

3. The method of claim 1, wherein attempting to decode the second codeblock group using the stored post processing samples further comprises:
   regenerating a corresponding redundancy version for the first plurality of codeblocks from the first code block group and associated with the first decoding level from the first time period;
   determining partitioning information based at least in part on the successful decoding the first codeblock group and the regenerated redundancy version; and
   attempting to decode the second codeblock group from the first time period based at least in part on the partitioning information.

4. The method of claim 3, further comprising:
   transmitting, in response to successfully decoding the first codeblock group based at least in part on the one or more retransmissions of the first codeblock group, a second feedback message comprising an indication that the decoding procedure was successful for the first codeblock group.

5. The method of claim 3, further comprising:
transmitting a second feedback message comprising an indication that the decoding procedure was unsuccessful for the second codeblock group transmitted in the first time period.

6. The method of claim 5, further comprising:
receiving, in a third time period, a transmission of a new set of data for the first codeblock group;
receiving, in the third time period, a retransmission of the second codeblock group; and
attempting to decode the retransmission of the second codeblock group based at least in part on the successful decoding of the new data for the first codeblock group and based on log likelihood ratios (LLRs) combining for the first transmission of the second codeblock group and the retransmission of the second codeblock group.

7. The method of claim 6, further comprising:
transmitting a third feedback message comprising an indication that the decoding procedure was successful for the first codeblock group from the third time period; and
transmitting a fourth feedback message comprising an indication that the decoding procedure was successful for the second codeblock group from the first time period based at least in part on the stored post processing samples and LLRs combining of the second codeblock group transmitted in the first time period and the retransmission of the second codeblock group in the third time period.

8. The method of claim 1, wherein transmitting the feedback message further comprises:
transmitting a negative acknowledgement message for the first codeblock group and the second codeblock group.

9. The method of claim 1, wherein the first decoding level has shorter or same length codeblocks compared to the second decoding level.

10. The method of claim 1, wherein the first decoding level has longer codeblocks than the second decoding level.

11. The method of claim 1, further comprising:
transmitting an indication of a capability of the UE to support hierarchical acknowledgment feedback and a number of hybrid automatic repeat request processes across the plurality of decoding levels, wherein the retransmission of the first codeblock group is received with a new data transmission for the second code block group based at least in part on the transmitted indication.

12. A method for wireless communications at a network device, comprising:
encoding, according to a coding and modulation procedure with a plurality of decoding levels, at least a first codeblock group comprising a first plurality of codeblocks and a second codeblock group corresponding to the first codeblock group and comprising a second plurality of codeblocks, each codeblock of the first plurality of codeblocks associated with a first decoding level of the plurality of decoding levels, and each codeblock of the second plurality of codeblocks associated with a second decoding level of the plurality of decoding levels, the first decoding level lower than the second decoding level, and the first decoding level to be decoded prior to decoding of the second decoding level;

transmitting, to a user equipment (UE) in a first time period and on a same set of channel resources, a multi-level coded and modulated signal comprising the encoded first codeblock group and the encoded second codeblock group;
receiving, from the UE, a feedback message comprising an indication that a decoding procedure was unsuccessful for the first codeblock group and the second codeblock group;
encoding, according to the coding and modulation procedure, a retransmission of the first codeblock group and a new set of codeblocks for the corresponding second codeblock group associated with the second decoding level; and
transmitting, to the UE in a second time period in response to receiving the feedback message, the retransmission of the first codeblock group and the new set of codeblocks for the second codeblock group.

13. The method of claim 12, further comprising:
receiving, from the UE, a second feedback message comprising an indication that the decoding procedure was unsuccessful for the second codeblock group from the first time period and was successful for the first codeblock group from the first time period after retransmission; and
receiving, from the UE, a third feedback message comprising an indication that the decoding procedure was successful for the new set of codeblocks for the second codeblock group.

14. The method of claim 13, further comprising:
transmitting, to the UE in a third time period, a transmission of a new set of codeblocks for the first codeblock group associated with the first decoding level; and
transmitting, to the UE in the third time period, a retransmission of the second codeblock group from the first time period.

15. The method of claim 14, further comprising:
receiving, from the UE, a fourth feedback message comprising an indication that the decoding procedure was successful for the second codeblock group from the first time period and for the new set of blocks for the first codeblock group from the third time period.

16. The method of claim 12, wherein receiving the feedback message further comprises:
receiving a negative acknowledgement message for the first codeblock group and the second codeblock group.

17. The method of claim 12, wherein the first decoding level has shorter or same length codeblocks compared to the second decoding level.

18. The method of claim 12, wherein the first decoding level has longer codeblocks than the second decoding level.

19. The method of claim 12, further comprising:
receiving, from the UE, an indication of a capability of the UE to support hierarchical acknowledgment feedback and a number of hybrid automatic repeat request processes across the plurality of decoding levels, wherein the retransmission of the first codeblock group is transmitted with a new set of codeblocks for the second code block group based at least in part on the received indication.

20. The method of claim 19, further comprising:
receiving, from the UE, an indication of a capability of the UE to support a maximum number of hierarchical hybrid automatic repeat request buffers associated with the number of hybrid automatic repeat request processes.

21. An apparatus for wireless communications at a user equipment (UE), comprising:
a processor,
memory coupled with the processor; and
instructions stored in the memory and executable by the processor to cause the apparatus to:
receive, in a first time period and on a same set of channel resources, a signal encoded with a plurality of decoding levels, the signal comprising at least a first codeblock group and a second codeblock group corresponding to the first codeblock group, the first codeblock group comprising a first plurality of codeblocks and the second codeblock group comprising a second plurality of codeblocks, each codeblock of the first plurality of codeblocks associated with a first decoding level of the plurality of decoding levels and each codeblock of the second plurality of codeblocks associated with a second decoding level of the plurality of decoding levels, wherein the first decoding level is lower than the second decoding level, and the first decoding level is to be decoded prior to decoding of the second decoding level;
determine that a decoding procedure associated with at least one codeblock of the first codeblock group is unsuccessful;
store post processing samples for the signal, wherein the post processing samples comprise frequency domain samples for resource elements of the at least one codeblock of the first codeblock group;
transmit a feedback message comprising an indication that the decoding procedure was unsuccessful for the first codeblock group and the second codeblock group;
receive, in a second one or more time periods and in response to the transmitted feedback message, one or more retransmissions of the first codeblock group;
successfully decode the first codeblock group based at least in part on the first codeblock group from the first time period and the one or more retransmissions of the first codeblock group from the second one or more time periods; and
attempt to decode the second codeblock group from the first time period using the stored post processing samples and based at least in part on the successful decoding of the corresponding first codeblock group.

22. The apparatus of claim 21, wherein the instructions are further executable by the processor to cause the apparatus to:
receive, in at least one of the second one or more time periods, a transmission of a new set of codeblocks for the second codeblock group.

23. The apparatus of claim 21, wherein the instructions to attempt to decode the second codeblock group using the stored post processing samples further are executable by the processor to cause the apparatus to:
regenerate a corresponding redundancy version for the first plurality of codeblocks from the first codeblock group and associated with the first decoding level from the first time period;
determine partitioning information based at least in part on the successful decoding the first codeblock group and the regenerated redundancy version; and
attempt to decode the second codeblock group from the first time period based at least in part on the partitioning information.

24. The apparatus of claim 23, wherein the instructions are further executable by the processor to cause the apparatus to:
transmit, in response to successfully decoding the first codeblock group based at least in part on the one or more retransmissions of the first codeblock group, a second feedback message comprising an indication that the decoding procedure was successful for the first codeblock group.

25. The apparatus of claim 23, wherein the instructions are further executable by the processor to cause the apparatus to:
transmit a second feedback message comprising an indication that the decoding procedure was unsuccessful for the second codeblock group transmitted in the first time period.

26. The apparatus of claim 25, wherein the instructions are further executable by the processor to cause the apparatus to:
receive, in a third time period, a transmission of a new set of data for the first codeblock group;
receive, in the third time period, a retransmission of the second codeblock group; and
attempt to decode the retransmission of the second codeblock group based at least in part on the successful decoding of the new data for the first codeblock group and based on log likelihood ratios (LLRs) combining for the first transmission of the second codeblock group and the retransmission of the second codeblock group.

27. The apparatus of claim 26, wherein the instructions are further executable by the processor to cause the apparatus to:
transmit a third feedback message comprising an indication that the decoding procedure was successful for the first codeblock group from the third time period; and
transmit a fourth feedback message comprising an indication that the decoding procedure was successful for the second codeblock group from the first time period based at least in part on the stored post processing samples and LLRs combining of the second codeblock group transmitted in the first time period and the retransmission of the second codeblock group in the third time period.

28. The apparatus of claim 21, wherein the instructions to transmit the feedback message further are executable by the processor to cause the apparatus to:
transmit a negative acknowledgement message for the first codeblock group and the second codeblock group.

29. The apparatus of claim 21, wherein the first decoding level has shorter or same length codeblocks compared to the second decoding level.

30. The apparatus of claim 21, wherein the first decoding level has longer codeblocks than the second decoding level.

31. The apparatus of claim 21, wherein the instructions are further executable by the processor to cause the apparatus to:
transmit an indication of a capability of the UE to support hierarchical acknowledgment feedback and a number of hybrid automatic repeat request processes across the plurality of decoding levels, wherein the retransmission of the first codeblock group is received with a new data transmission for the corresponding second code block group based at least in part on the transmitted indication.

32. An apparatus for wireless communications at a network device, comprising:
a processor, memory coupled with the processor; and instructions stored in the memory and executable by the processor to cause the apparatus to:

encode, according to a coding and modulation procedure with a plurality of decoding levels, at least a first codeblock group comprising a first plurality of codeblocks and a second codeblock group corresponding to the first codeblock group and comprising a second plurality of codeblocks, each codeblock of the first plurality of codeblocks associated with a first decoding level of the plurality of decoding levels, and each codeblock of the second plurality of codeblocks associated with a second decoding level of the plurality of decoding levels, the first decoding level lower than the second decoding level, and the first decoding level to be decoded prior to decoding of the second decoding level;

transmit, to a user equipment (UE) in a first time period and on a same set of channel resources, a coded and modulated signal comprising the encoded first codeblock group and the encoded second codeblock group;

receive, from the UE, a feedback message comprising an indication that a decoding procedure was unsuccessful for the first codeblock group and the second codeblock group;

encode, according to the multi-level coding and modulation procedure, a retransmission of the first codeblock group and a new set of codeblocks for the corresponding second codeblock group associated with the second decoding level; and transmit, to the UE in a second time period in response to receiving the feedback message, the retransmission of the first codeblock group and the new set of codeblocks for the second codeblock group.

33. The apparatus of claim 32, wherein the instructions are further executable by the processor to cause the apparatus to:

receive, from the UE, a second feedback message comprising an indication that the decoding procedure was unsuccessful for the second codeblock group from the first time period and was successful for the first codeblock group from the first time period after retransmission; and receive, from the UE, a third feedback message comprising an indication that the decoding procedure was successful for the new set of codeblocks for the second codeblock group.

34. The apparatus of claim 33, wherein the instructions are further executable by the processor to cause the apparatus to:

transmit, to the UE in a third time period, a transmission of a new set of codeblocks for the first codeblock group associated with the first decoding level; and transmit, to the UE in the third time period, a retransmission of the second codeblock group from the first time period.

35. The apparatus of claim 34, wherein the instructions are further executable by the processor to cause the apparatus to:

receive, from the UE, a fourth feedback message comprising an indication that the decoding procedure was successful for the second codeblock group from the first time period and for the new set of blocks for the first codeblock group from the third time period.

36. The apparatus of claim 32, wherein the instructions to receive the feedback message further are executable by the processor to cause the apparatus to:

receive a negative acknowledgement message for the first codeblock group and the second codeblock group.

37. The apparatus of claim 32, wherein the first decoding level has shorter or same length codeblocks compared to the second decoding level.

38. The apparatus of claim 32, wherein the first decoding level has longer codeblocks than the second decoding level.

39. The apparatus of claim 32, wherein the instructions are further executable by the processor to cause the apparatus to:

receive, from the UE, an indication of a capability of the UE to support hierarchical acknowledgment feedback and a number of hybrid automatic repeat request processes across the plurality of decoding levels, wherein the retransmission of the first codeblock group is transmitted with a new set of codeblocks for the corresponding second code block group based at least in part on the received indication.

40. The apparatus of claim 39, wherein the instructions are further executable by the processor to cause the apparatus to:

receive, from the UE, an indication of a capability of the UE to support a maximum number of hierarchical hybrid automatic repeat request buffers associated with the number of hybrid automatic repeat request processes.

41. An apparatus for wireless communications at a user equipment (UE), comprising:

means for receiving, in a first time period and on a same set of channel resources, a signal encoded with a plurality of decoding levels, the signal comprising at least a first codeblock group and a second codeblock group corresponding to the first codeblock group, the first codeblock group comprising a first plurality of codeblocks and the second codeblock group comprising a second plurality of codeblocks, each codeblock of the first plurality of codeblocks associated with a first decoding level of the plurality of decoding levels and each codeblock of the second plurality of codeblocks associated with a second decoding level of the plurality of decoding levels, wherein the first decoding level is lower than the second decoding level, and the first decoding level is to be decoded prior to decoding of the second decoding level;

means for determining that a decoding procedure associated with at least one codeblock of the first codeblock group is unsuccessful;

means for storing post processing samples for the signal, wherein the post processing samples comprise frequency domain samples for resource elements of the at least one codeblock of the first codeblock group;

means for transmitting a feedback message comprising an indication that the decoding procedure was unsuccessful for the first codeblock group and the second codeblock group;

means for receiving, in a second one or more time periods and in response to the transmitted feedback message, one or more retransmissions of the first codeblock group;

means for successfully decoding the first codeblock group based at least in part on the first codeblock group from the first time period and the one or more retransmissions of the first codeblock group from the second one or more time periods; and means for attempting to decode the second codeblock group from the first time period using the stored post processing samples and based at least in part on the successful decoding of the corresponding first codeblock group.

42. An apparatus for wireless communications at a network device, comprising:
   means for encoding, according to a coding and modulation procedure with a plurality of decoding levels, at least a first codeblock group comprising a first plurality of codeblocks and a second codeblock group corresponding to the first codeblock group and comprising a second plurality of codeblocks, each codeblock of the first plurality of codeblocks associated with a first decoding level of the plurality of decoding levels, and each codeblock of the second plurality of codeblocks associated with a second decoding level of the plurality of decoding levels, the first decoding level lower than the second decoding level, and the first decoding level to be decoded prior to decoding of the second decoding level;
   means for transmitting, to a user equipment (UE) in a first time period and on a same set of channel resources, a coded and modulated signal comprising the encoded first codeblock group and the encoded second codeblock group;
   means for receiving, from the UE, a feedback message comprising an indication that a decoding procedure was unsuccessful for the first codeblock group and the second codeblock group;
   means for encoding, according to the multi-level coding and modulation procedure, a retransmission of the first codeblock group and a new set of codeblocks for the corresponding second codeblock group associated with the second decoding level; and
   means for transmitting, to the UE in a second time period in response to receiving the feedback message, the retransmission of the first codeblock group and the new set of codeblocks for the second codeblock group.

43. A non-transitory computer-readable medium storing code for wireless communications at a user equipment (UE), the code comprising instructions executable by a processor to:
   receive, in a first time period and on a same set of channel resources, a signal encoded with a plurality of decoding levels, the signal comprising at least a first codeblock group and a second codeblock group corresponding to the first codeblock group, the first codeblock group comprising a first plurality of codeblocks and the second codeblock group comprising a second plurality of codeblocks, each codeblock of the first plurality of codeblocks associated with a first decoding level of the plurality of decoding levels and each codeblock of the second plurality of codeblocks associated with a second decoding level of the plurality of decoding levels, wherein the first decoding level is lower than the second decoding level, and the first decoding level is to be decoded prior to decoding of the second decoding level;
   determine that a decoding procedure associated with at least one codeblock of the first codeblock group is unsuccessful;
   store post processing samples for the signal, wherein the post processing samples comprise frequency domain samples for resource elements of the at least one codeblock of the first codeblock group;
   transmit a feedback message comprising an indication that the decoding procedure was unsuccessful for the first codeblock group and the second codeblock group;
   receive, in a second one or more time periods and in response to the transmitted feedback message, one or more retransmissions of the first codeblock group;
   successfully decode the first codeblock group based at least in part on the first codeblock group from the first time period and the one or more retransmissions of the first codeblock group from the second one or more time periods; and
   attempt to decode the second codeblock group from the first time period using the stored post processing samples and based at least in part on the successful decoding of the corresponding first codeblock group.

44. A non-transitory computer-readable medium storing code for wireless communications at a network device, the code comprising instructions executable by a processor to:
   encode, according to a coding and modulation procedure with a plurality of decoding levels, at least a first codeblock group comprising a first plurality of codeblocks and a second codeblock group corresponding to the first codeblock group and comprising a second plurality of codeblocks, each codeblock of the first plurality of codeblocks associated with a first decoding level of the plurality of decoding levels, and each codeblock of the second plurality of codeblocks associated with a second decoding level of the plurality of decoding levels, the first decoding level lower than the second decoding level, and the first decoding level to be decoded prior to decoding of the second decoding level;
   transmit, to a user equipment (UE) in a first time period and on a same set of channel resources, a coded and modulated signal comprising the encoded first codeblock group and the encoded second codeblock group;
   receive, from the UE, a feedback message comprising an indication that a decoding procedure was unsuccessful for the first codeblock group and the second codeblock group;
   encode, according to the multi-level coding and modulation procedure, a retransmission of the first codeblock group and a new set of codeblocks for the corresponding second codeblock group associated with the second decoding level; and
   transmit, to the UE in a second time period in response to receiving the feedback message, the retransmission of the first codeblock group and the new set of codeblocks for the second codeblock group.

* * * * *